(12) United States Patent
Jin et al.

(10) Patent No.: US 7,715,845 B2
(45) Date of Patent: May 11, 2010

(54) TONE HOPPING METHODS AND APPARATUS

(75) Inventors: Hui Jin, Annandale, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 770 days.

(21) Appl. No.: 11/316,353

(22) Filed: Dec. 22, 2005

(65) Prior Publication Data

US 2007/0064730 A1 Mar. 22, 2007
US 2009/0122810 A9 May 14, 2009

Related U.S. Application Data

(63) Continuation-in-part of application No. 10/965,011, filed on Oct. 14, 2004, now Pat. No. 7,379,446.

(60) Provisional application No. 60/717,701, filed on Sep. 16, 2005.

(51) Int. Cl.
*G06F 15/00* (2006.01)
(52) U.S. Cl. ...................................... 455/447; 455/522
(58) Field of Classification Search .................. 370/208, 370/319, 468; 455/522; 375/138
See application file for complete search history.

(56) References Cited

U.S. PATENT DOCUMENTS 5,355,367 A 10/1994 Comroe et al.
5,410,538 A 4/1995 Roche et al.
5,561,842 A 10/1996 Ritter et al.
5,561,852 A 10/1996 Heeschen et al.

(Continued)

FOREIGN PATENT DOCUMENTS

CA 2298360 9/2000

(Continued)

OTHER PUBLICATIONS

Wang C C et al: "Dynamic Channel Resource Allocation in Frequency Hopped Wireless Communication Systems", Information Theory, 1994. Proceedings, 1994 IEEE International Symposium on Trondheim, Norway 27, Jun. 1, Jul. 1994, New York, NY, U.S.A., IEEE, Jun. 27, 1994, p. 229.

(Continued)

*Primary Examiner*—Sam Bhattacharya
(74) *Attorney, Agent, or Firm*—James K. O'Hare

(57) ABSTRACT

Methods and apparatus for allocating and hopping tones for uplink communications purposes in adjacent sectors and neighboring cells of an OFDM system are described. Physical tones used in each sector and cell are allocated to tone hopping sequences according to a tone to tone hopping sequence allocation function which uses both a cell identifier and sector identifier. Different sectors and cells use different tone to tone hopping sequence allocation functions through the use of different cell and/or sector identifiers to minimize the number of collisions between hopping sequences of adjacent sectors and neighboring cells. Uplink tone hopping sequences, corresponding to logical tones are allocated to uplink communications channels. Uplink communications channels are used by wireless terminals, e.g., mobile nodes, to transmit data to base stations. Over time, a wireless terminal uses the tones included in the uplink tone hopping sequences corresponding to uplink communications channels it is authorized to use.

77 Claims, 11 Drawing Sheets

U.S. PATENT DOCUMENTS

| | | | |
|---|---|---|---|
| 5,570,352 | A | 10/1996 | Poyhonen |
| 5,867,478 | A | 2/1999 | Baum et al. |
| 5,911,120 | A | 6/1999 | Jarett et al. |
| 6,005,856 | A | 12/1999 | Jensen et al. |
| 6,018,317 | A | 1/2000 | Dogan et al. |
| 6,038,450 | A | 3/2000 | Brink et al. |
| 6,064,692 | A | 5/2000 | Chow |
| 6,078,571 | A | 6/2000 | Hall |
| 6,078,823 | A | 6/2000 | Chavez et al. |
| 6,088,592 | A | 7/2000 | Doner et al. |
| 6,118,805 | A | 9/2000 | Bergstrom et al. |
| 6,131,016 | A | 10/2000 | Greenstein et al. |
| 6,161,000 | A | 12/2000 | Yang et al. |
| 6,275,518 | B1 | 8/2001 | Takahashi et al. |
| 6,282,185 | B1 | 8/2001 | Hakkinen et al. |
| 6,377,566 | B1 | 4/2002 | Cupo et al. |
| 6,377,636 | B1 | 4/2002 | Paulraj et al. |
| 6,385,188 | B1 | 5/2002 | Kim et al. |
| 6,400,704 | B2 | 6/2002 | Mikuni et al. |
| 6,473,418 | B1 | 10/2002 | Laroia et al. |
| 6,473,467 | B1 | 10/2002 | Wallace et al. |
| 6,542,485 | B1 | 4/2003 | Mujtaba |
| 6,587,526 | B1 | 7/2003 | Li et al. |
| 6,647,066 | B1 | 11/2003 | Szajnowski |
| 6,661,771 | B1 | 12/2003 | Cupo et al. |
| 6,665,277 | B1 | 12/2003 | Sriram et al. |
| 6,711,120 | B1 | 3/2004 | Laroia et al. |
| 6,711,208 | B2 | 3/2004 | Razoumov et al. |
| 6,735,420 | B2 | 5/2004 | Baldwin |
| 6,751,444 | B1 | 6/2004 | Meiyappan |
| 6,768,714 | B1 | 7/2004 | Heinonen et al. |
| 6,810,254 | B2 | 10/2004 | Tiedemann et al. |
| 6,842,444 | B2 | 1/2005 | Bolgiano et al. |
| 6,954,641 | B2 | 10/2005 | McKenna et al. |
| 6,985,434 | B2 | 1/2006 | Wu et al. |
| 6,996,418 | B2 | 2/2006 | Teo et al. |
| 7,065,165 | B2 | 6/2006 | Heinonen et al. |
| 7,142,888 | B2 | 11/2006 | Okawa et al. |
| 7,184,419 | B2 | 2/2007 | Hwang et al. |
| 7,218,948 | B2 | 5/2007 | Laroia et al. |
| 7,272,409 | B2 | 9/2007 | Dillon et al. |
| 7,308,279 | B1 | 12/2007 | Zweig |
| 7,366,200 | B2 | 4/2008 | Laroia et al. |
| 2001/0043578 | A1 | 11/2001 | Kumar et al. |
| 2002/0154705 | A1 | 10/2002 | Walton et al. |
| 2004/0233871 | A1 | 11/2004 | Seki et al. |
| 2006/0083189 | A1* | 4/2006 | Laroia et al. ............... 370/319 |

FOREIGN PATENT DOCUMENTS

| | | |
|---|---|---|
| CA | 2536261 | 3/2004 |
| EP | 0833456 | 4/1998 |
| EP | 1 043 861 A1 | 10/2000 |
| EP | 1148673 | 10/2001 |
| RU | 2117395 | 8/1998 |
| WO | WO 97/26742 | 7/1997 |
| WO | 2004019529 | 3/2004 |
| WO | 2004019538 | 3/2004 |
| WO | WO 2004/019537 A2 | 3/2004 |

OTHER PUBLICATIONS

Fazel K et al: "A Flexible and High Performance Cellular Mobile Communications System Based on Orthogonal Multi-Carrier SSMA", Wireless Personal Communications, Kluwer Academic Publishers, NL, vol. 2, No. ½, 1995, pp. 121-144.

Tufvesson et al: "Pilot Assisted Channel Estimation for OFDM in Mobile Cellular Systems", 1997 IEEE $47^{th}$ Vehicular Technology Conference, New York, vol. 3, Conf. 4,May 4, 1997, pp. 1639-1643.

U. Reimers: "Digital Video Broadcasting", IEEE Communications Magazine, IEEE Service Center, Piscataway, NJ, U.S.A., vol. 36 No. 6, Jun. 1, 1998, pp. 104-110.

Han D S et al: "On the Synchronization of MC-CDMA System for Indoor Wireless Communications", VTC 1999-Fall, IEEE VTS $50^{th}$, Vehicular Technology Conference; Gateway to the $21^{st}$ Century Communications Village, Amsterdam, Sep. 19-22, 1999, IEEE Vehicular Technology Conference, New York, NY, U.S.A, vol. 2, Conf. 50, Sep. 1999, pp. 693-697.

Fernandez-Getino Garcia J et al.: "Efficient Pilot Patterns for Channel Estimation in OFDM Systems Over HF Channels", VTC 1999-Fall, IEEE VTS $50^{th}$, Vehicular Technology Conference, Gateway to the $21^{st}$, Century Communications Village, Amsterdam, Sep. 19-22, 1999, IEEE Vehicular Technology Conference, New York, NY, U.S. A., vol. 4, Conf 50, Sep. 19, 1999, pp. 2193-2197.

Notification of Transmittal of the International Search Report and the Written Opinion of the International Searching Authority with the International Search Report and Written Opinion of the International Searching Authority from International Application No. PCT/US2006/035279, dated Feb. 13, 2007, pp. 1-14.

Li, Junyi et al. "An Integrated Approach Based on Cross-Layer Optimization—Designing a Mobile Broadband Wireless Access Network" IEEE Signal Processing Magazine, IEEE Service Center, Piscataway, NJ, US, vol. 21, No. 5, Sep. 2004, pp. 20-28.

Tse, David et al. "Fundamental of Wireless Communications" [Online]. Aug. 13, 2004, pp. 171-179, XP002417496, Retrieved from the Internet: URL: http://web.archive.org/web/20050217042523/ http://www.eecs.berkeley.edu/_{dtse/main.pdf> [retrieved on Jan. 30, 2007].

Aue, "Multi-carrier spread spectrum modulation with reduced dynamic range," IEEE vehicular Technology Conference, Apr. 28, 1996- May 4, 1996, pp. 914-917.

Chan-Soo, Hwang, "A Peak Power Reduction Method for Multicarrier Transmission," IEEE International Conference on Communications, Jun. 11-14, 2001. vol. 5, pp. 1496-1500.

Chen, Hang et al., "An Orthogonal Projection-based Approach for PAR Reduction in OFDM," IEEE Communications Letters. May 2002. vil. 6, issue 5, pp. 169-171.

* cited by examiner

FIGURE 5

| | (k=0) | (k=1) | (k=2) | (k=3) | (k=4) |
|---|---|---|---|---|---|
| (j=0) | 0 | 1 | 2 | 1 | 0 |
| (j=1) | 2 | 4 | 1 | 4 | 2 |
| (j=2) | 4 | 0 | 3 | 0 | 4 |
| (j=3) | 1 | 3 | 4 | 3 | 1 |
| (j=4) | 3 | 2 | 0 | 2 | 3 |

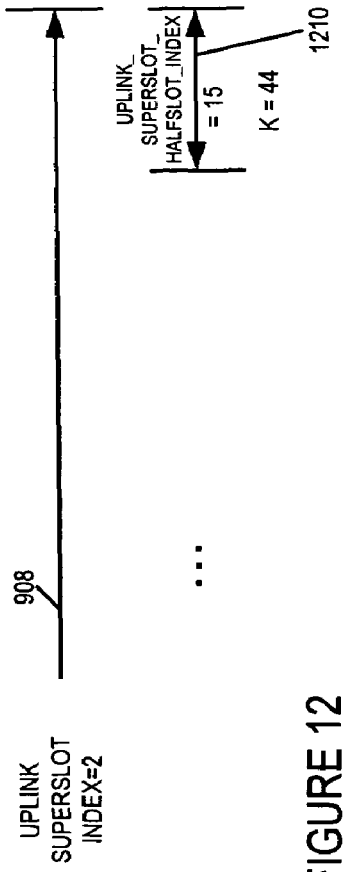
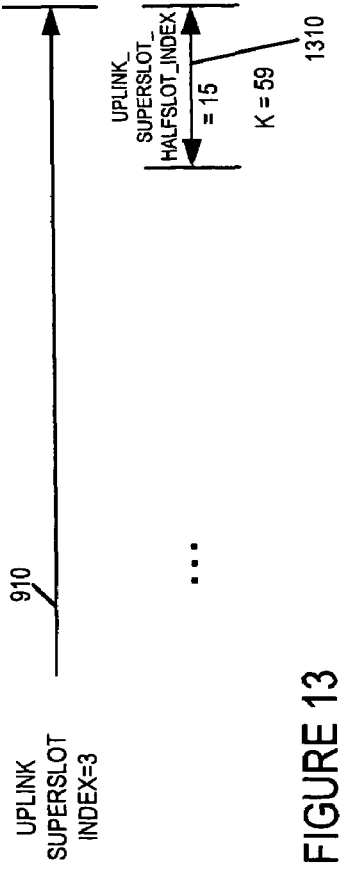
FIGURE 11
FIGURE 12
FIGURE 13

TONE HOPPING METHODS AND APPARATUS

RELATED APPLICATIONS

The present application is a continuation-in-part of U.S. patent application Ser. No. 10/965,011 filed Oct. 14, 2004 which issued as U.S. Pat. No. 7,379,446 and claims the benefit of U.S. Provisional Patent Application Ser. No. 60/717,701, filed on Sep. 16, 2005, titled "TONE HOPPING METHODS AND APPARATUS", which is hereby expressly incorporated by reference.

FIELD OF THE INVENTION

The present invention relates to communications systems and, more particularly, to methods and apparatus for allocating tones, e.g., in a cellular communications network.

BACKGROUND

In a cellular wireless system, a service area is divided into a number of coverage zones generally referred to as cells. Each cell may be further subdivided into a number of sectors. Wireless terminals in a cell communicate with the base station that serves the cell. Wireless terminals may include a wide range of mobile devices including, e.g., cell phones and other mobile transmitters such as personal data assistants with wireless modems.

A problem with known cellular communications systems is that transmission by wireless devices in one sector of a cell may collide with transmissions by wireless devices in an adjacent sector of the same cell or in a neighboring cell. For example, orthogonal frequency division multiplexed (OFDM) systems take a given bandwidth and splits it into a number of evenly spaced tones that can be used to transmit data. When transmissions by devices in overlapping sectors and/or cells use the same tone or set of tones, multiple collisions may occur over a period of time due to the operation of devices in adjacent sectors and/or neighboring cells. This problem is particularly noticeable where transmissions are periodic or nearly periodic.

In periodic or nearly periodic situations, mutual interference caused by wireless terminals in adjacent sectors and/or cells may be highly correlated. For example, when a tone assigned to a wireless terminal A corresponding to a first sector is the same as a tone of another wireless terminal B corresponding to an adjacent sector, in the next transmission period, the tone of wireless terminal A will again be the same as wireless terminal B in the case where the tones are assigned using the same function and recur periodically. Correlated interference of this type can cause signals transmitted by the same two wireless terminals to repeatedly interfere with each other over a long period of time. If the two interfering wireless terminals are disadvantageously located, e.g. in a boundary region between two adjacent sectors, the base station's receivers for each sector may not be able to detect the signals correctly from the two interfering wireless terminals for a long period of time.

In order to reduce the risk of correlated or prolonged interference it would be beneficial if it was possible to assign tones to devices in neighboring sectors and cells in a manner that would minimize the risk of correlated interference.

Some approaches use a cell identifier in controlling the hopping sequence used by mobiles. The mobile may detect the cell identifier and then use it in a hopping equation to control uplink hopping. By using different cell identifiers at neighboring base stations, hopping can be controlled using a hopping equation based on the cell identifier.

As the demand for cell capacity has increased, sectorizaton of cells has grown in importance. This has complicated the problem of how to implement and control hopping in cells to achieve a desirable result, e.g., control the collisions between cells. With the advent of sectors, there has developed a need to control hopping not only with respect to other cells but with respect to neighboring sectors within a cell. While assigning sectors individual identifiers which can be used as a single control value in controlling hopping sequences as was done previously with cell identifiers, given the relatively large number of sectors in a system, the length of the identifier would need to be larger than in the case of where a cell identifier was previously used, if the same number of cells is to be supported in a system.

For a variety of reasons, using large sector identifiers can be undesirable. Furthermore, for a variety of reasons, it can be desirable to have separate cell and sector identifiers with the cell and sector information. This allows for the cell and/or sector information to be transmitted differently and/or at different rates of frequency.

In view of the above discussion, it should be appreciated that it would be desirable if method and apparatus could be developed which would allow wireless terminals to control tone hopping based on a combination of a cell identifier and a sector identifier while still achieving both highly predictable and desirable collusion properties with respect to transmissions by adjoining sectors of the same or neighboring base stations.

In view of the above discussion, it becomes apparent that there is a need for minimizing the potential for collisions between transmissions that occur in adjacent cells and neighboring cells of a wireless communications system which supports the use of multi-sector cells. It is desirable that the probability that transmissions from any given device in adjacent sectors or neighboring cells will collide repeatedly be minimized to avoid extended periods where communication signals are blocked for any particular device.

BRIEF DESCRIPTION OF THE FIGURES

FIG. 5 illustrate examples of the tone allocations of uplink hopping sequences in accordance with the present invention.

FIGS. 10-15 include drawing of exemplary uplink timing structure and determined time dependent K values with respect to an exemplary uplink timing structure, the value K being used as an input in determining the uplink tone hopping in accordance with an exemplary embodiment of the present invention.

SUMMARY OF INVENTION

Figure 1:
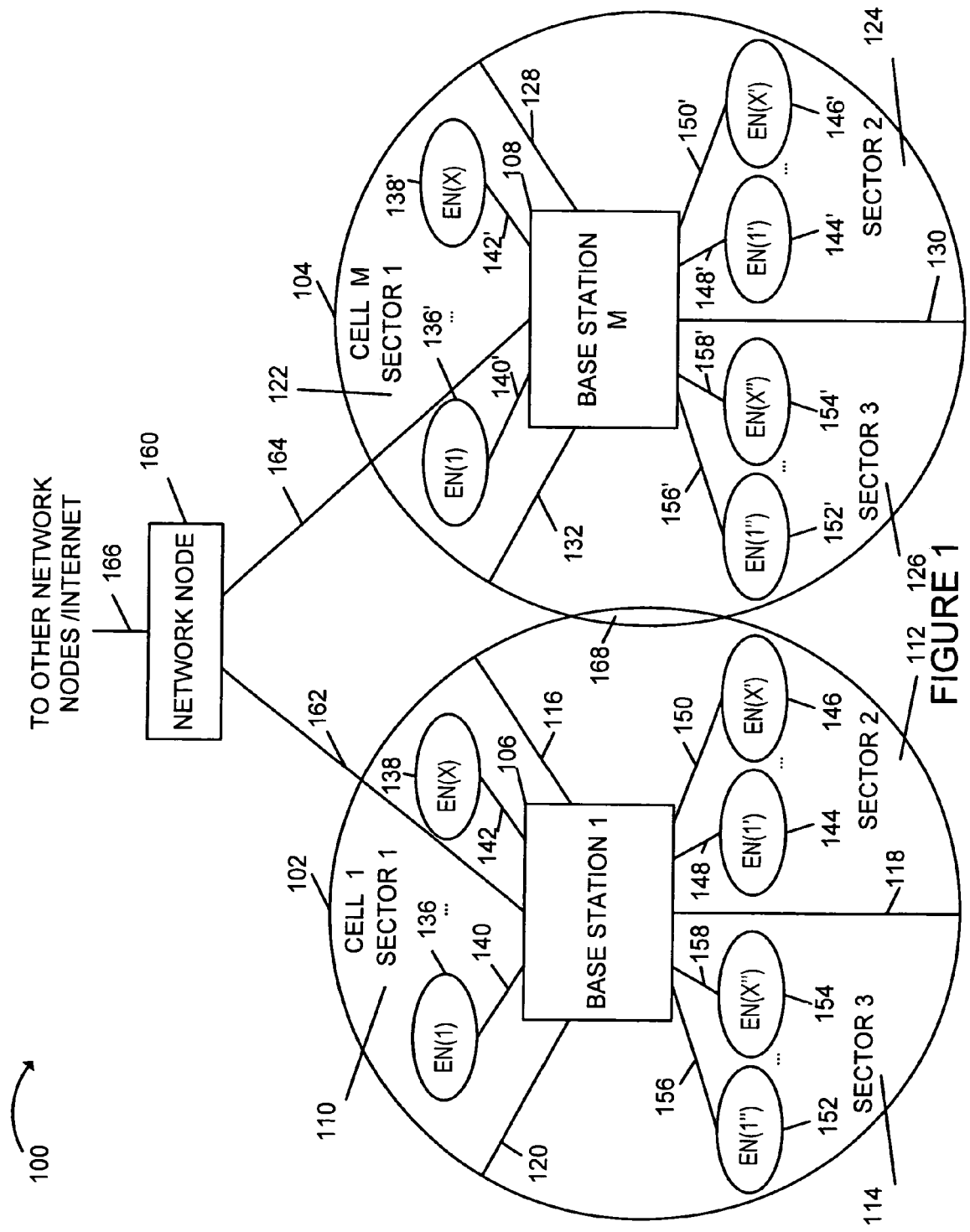
FIG. 1 illustrates an exemplary multi-sector multi-cell communication system implemented in accordance with the invention.

The present invention is directed to communications methods and apparatus and, more particularly, to methods and apparatus for allocating and using tones for communications purposes in a multi-tone multi-sector, multi-cell communications system. The system may be, for example, an orthogonal frequency division multiplexed (OFDM) system. The OFDM system may use the same set of tones in each of the sectors or each of the cells of the system simultaneously.

In accordance with the present invention, tones are allocated in each of the sectors of a cell of a communications system, e.g., by the base station included in each cell, to uplink tone hopping sequences according to functions selected to minimize repeated collisions between hopping sequences of adjacent sectors and neighboring base stations. Wireless terminals within each sector of each cell implement the same tone allocation function as the base station in the sector of the cell to determine which tones to use. Both a cell identifier and a sector identifier are used in combination to determine the tone hopping to be performed. Thus, tone hopping is control by two control factors and not simply a cell identifier while achieving desirable collusion properties. In various embodiments, the cell and/or sector identifier to be used at a particular time is determined from broadcast signals received from the cell/sector with which a wireless terminal is trying to communicate. However, the cell/sector information for a give area may be preprogrammed and the hopping techniques of the invention do not require that the cell/sector information be received over an airlink although it is desirable in many cases so that wireless terminals do not have to store such information for large geographic areas.

In various embodiments, tones are allocated for a period of time known as a tone allocation period, also referred to as a dwell. Each tone corresponds to a different frequency.

The functions used to allocate tones to uplink tone hopping functions in accordance with the present invention are selected to minimize repeated collisions between uplink tone hopping sequences in a predictable manner even when the tones, e.g., frequencies, used for transmission in neighboring base stations are misaligned. Such frequency misalignment may be due to base station clock errors or other frequency discrepancies between base stations.

In accordance with one exemplary embodiment of the invention, a first base station for a first sector allocates each tone, in a first set of P tones, once during each of a first plurality of P sequential tone allocation periods to a different one of a first plurality of P tone hopping sequences. The first sector tone hopping sequences are used to determine tone allocation for use in uplink communication from a wireless terminal to the first base station in the first sector. Allocation of tones by the first base station for the first sector is performed according to a first function which allocates each of the P tones used by the first base station to a different one of the first set of P tone hoping sequences during each of the plurality of P sequential tone allocation periods. Allocation of tones according to the first function repeats after P allocation periods.

The first base station for a second sector allocates each tone, in the first set of P tones, once during each of a first plurality of P sequential tone allocation periods to a different one of a second plurality of P tone hopping sequences. The second sector tone hopping sequences are used to determine tone allocation for use in uplink communication from a wireless terminal to the first base station in the second sector. Allocation of tones by the first base station for the second sector is performed according to a second function which allocates each of the P tones used by the first base station to a different one of the second sector of P tone hoping sequences during each of the plurality of P sequential tone allocation periods. Allocation of tones according to the second function repeats after P allocation periods.

A second base station with a third sector broadcast area that overlaps the broadcast area of the first base station allocates tones for the third sector in a second set of P tones, once during each of the first plurality of P sequential tone allocation periods according to a third function. The third function allocates, during each tone allocation period, each of the P tones in the second set of P tones, to a different one of a third plurality of P tone hopping sequences. The third function is different from said first function and said second function resulting in different tone to tone sequence allocations in the first and second sectors of the first cell and the third sector of the second cell.

The difference between the first and second functions may be as simple as the use of a different constant value by the first base station to distinguish between the first and second sectors when implementing the function used to allocate tones to tone hopping sequences. The constant value used to implement a base station's tone allocation function may be stored in the base station's memory as well as the memory of wireless terminals within the cell which includes the base station.

The difference between the first and third functions or second and third functions may be as simple as the use of a different constant value by each of the first and second base stations when implementing the function used to allocate tones to tone hopping sequences. The constant value used to implement a base station's tone allocation function may be stored in the base station's memory as well as the memory of wireless terminals within the cell which includes the base station.

The tone allocation function used to assign tones to tone hopping functions in one exemplary embodiment may be expressed as:

$$f_s^T(j,k) = s/((1/j) + T*k + k^2)$$

which represents a hopping sequence for a logical tone j at a time indicated by k.

where:

s=the cell slope value, and is the same for each of the sectors of the cell; adjacent cells should have different values for the cell slope value.

T=index of the sector. Assume sector type T is in the set {0, 1, . . . , 5}, {0, 1} or {0, 1, 2}; adjacent sectors should have different values of T.

$f_s^T$=a particular function in a sector with sector index T, of a cell with slope value s.

j=a logical tone and may be referred to as an index of a hopping sequence.

k=a measure of tone allocation period, also referred to as dwell index; a dwell represents the interval in time that a logical tone j remains on a specific physical tone before hopping to another physical tone.

Using the above function with different constant values T in adjacent sectors of a base station, it is possible to limit the number of collisions between hopping sequences of adjacent sectors in a manner that allows the tones of any one hopping sequence in the first set of P hopping sequences used by a first base station in the first sector to collide with any one hopping sequence in a second set of P hopping sequences used by a base station in a second, adjacent, sector at most once during any P sequential tone allocation periods, where P is a constant value indicating the number of tones allocated within a cell using the above function during a single tone allocation period.

Using the above function with different constant values s in neighboring base stations, it is possible to limit the number of collisions between hopping sequences of neighboring base stations in a manner that allows the tones of any one hopping sequence in the first set of P hopping sequences used by a first base station to collide with any one hopping sequence in a third set of P hopping sequences used by a neighboring base station at most twice during any P sequential tone allocation periods, where P is a constant value indicating the number of tones allocated within a cell using the above function during a single tone allocation period.

When the transmitters of the first and second base stations are synchronized in terms of frequency, the frequencies of the tones in the first and second sets of P tones will be the same. When synchronized, any one hopping sequence in the set of P hopping sequences used by a first base station will collide with any one hopping sequence in a third set of P hopping sequences used by the second base station, e.g., a neighboring base station, at most twice during any P sequential tone allocation periods.

The function used to allocate physical tones to a tone hopping sequence may be described as a tone to tone hopping sequence allocation function. The base stations and wireless terminals of a communications system implemented in accordance with the present invention use another function to determine which hopping sequences correspond to an uplink communications channel, and thus which tones correspond to said communications channel, during any given tone allocation period. The function used to allocate tone hopping sequences to uplink communications channels may be the same as the function used to allocate tones to tone hopping sequences.

Communications channels may be assigned to one or more wireless terminals for use in uplink communication with a base station of the present invention. Accordingly, to maintain synchronization, both the base station and wireless terminals in a cell implement the tone to tone hopping sequence allocation function and the tone hopping sequence to communications channel allocation function for the sector and cell of the present invention. Thus, multiple functions may be used as part of the process of determining the allocation of tones to wireless devices, e.g., mobile nodes and/or base stations.

In accordance with the invention, the method, functions, and sequences used for uplink (wireless terminal to base station) tone hopping is different from those for downlink (base station to wireless terminal) tone hopping.

In some embodiments of the invention, the uplink tone hopping sequence is truncated before full completion, i.e., allocation of tones according to the first, second or third function repeats over a time interval shorter than P allocation periods, and restarted, thus enabling faster synchronization to wireless terminal which may become active at any random time.

In some embodiments the uplink hopping sequence repeat interval is a multiple of the downlink hopping sequence interval, and the start time of the uplink hopping sequence may be synchronized, i.e., having a fixed timing relationship, with respect to the start time of a downlink hopping sequence. In some embodiments, the uplink hopping sequence may be synchronized with respect to a beacon signal, and there may be multiple uplink hopping sequences between successive beacon signals.

In some embodiments, there may be intervals of time between successive uplink hopping sequences, where the hopping is suspended, e.g., intervals of no uplink signaling allocation.

The functions of the present invention may be implemented using hardware, software of a combination of hardware and software. Tone allocation charts may be computed once and stored in the base station and/or mobile nodes so that re-computing of the allocation information need not be performed on a continuous basis. In such embodiments, allocation of tones and tone sequences is still performed according to the functions even though the functions are not performed in real time during the allocation process.

Numerous additional features, benefits and details of the methods and apparatus of the present invention are described in the detailed description which follows.

DETAILED DESCRIPTION OF INVENTION

FIG. 1 shows an exemplary communication system 100 implemented in accordance with the present invention including multiple cells: cell 1 102, cell M 104. Note that neighboring cells 102, 104 overlap slightly, as indicated by cell boundary region 168, thereby providing the potential for signal collisions between signals being transmitted by wireless devices in neighboring cells. Each cell 102, 104 of exemplary system 100 includes three sectors. Cells which have not be subdivided into multiple sectors (N=1), cells with two sectors (N=2) and cells with more than 3 sectors (N>3) are also possible in accordance with the invention. Cell 102 includes a first sector, sector 1 110, a second sector, sector 2 112, and a third sector, sector 3 114. Each sector 110, 112, 114 has two sector boundary regions; each boundary region is shared between two adjacent sectors. Sector boundary regions provide the potential for signal collisions between signals being transmitted by wireless devices in neighboring sectors. Line 116 represents a sector boundary region between sector 1 110 and sector 2 112; line 118 represents a sector boundary region between sector 2 112 and sector 3 114; line 120 represents a sector boundary region between sector 3 114 and sector 1 110. Similarly, cell M 104 includes a first sector, sector 1 122, a second sector, sector 2 124, and a third sector, sector 3 126. Line 128 represents a sector boundary region between sector 1 122 and sector 2 124; line 130 represents a sector boundary region between sector 2 122 and sector 3 126; line 132 represents a boundary region between sector 3 126 and sector 1 122. Cell 1 102 includes a base station (BS), base station 1 106, and a plurality of end nodes (ENs) in each sector 110, 112, 114. Sector 1 110 includes EN(1) 136 and EN(X) 138 coupled to BS 106 via wireless links 140, 142, respectively; sector 2 112 includes EN(1') 144 and EN(X') 146 coupled to BS 106 via wireless links 148, 150, respectively; sector 3 126 includes EN(1") 152 and EN(X") 154 coupled to BS 106 via wireless links 156, 158, respectively. Similarly, cell M 104 includes base station M 108, and a plurality of end nodes (ENs) in each sector 122, 124, 126. Sector 1 122 includes EN(1) 136' and EN(X) 138' coupled to BS M 108 via wireless links 140', 142', respectively; sector 2 124 includes EN(1')

144' and EN(X') 146' coupled to BS M 108 via wireless links 148', 150', respectively; sector 3 126 includes EN(1") 152' and EN(X") 154' coupled to BS 108 via wireless links 156', 158', respectively. System 100 also includes a network node 160 which is coupled to BS1 106 and BS M 108 via network links 162, 164, respectively. Network node 160 is also coupled to other network nodes, e.g., other base stations, AAA server nodes, intermediate nodes, routers, etc. and the Internet via network link 166. Network links 162, 164, 166 may be, e.g., fiber optic cables. Each end node, e.g. EN 1 136 may be a wireless terminal including a transmitter as well as a receiver. The wireless terminals, e.g., EN(1) 136 may move through system 100 and may communicate via wireless links with the base station in the cell in which the EN is currently located. The wireless terminals, (WTs), e.g. EN(1) 136, may communicate with peer nodes, e.g., other WTs in system 100 or outside system 100 via a base station, e.g. BS 106, and/or network node 160. WTs, e.g., EN(1) 136 may be mobile communications devices such as cell phones, personal data assistants with wireless modems, etc. Each base station performs tone allocation hopping using a different method for the uplink channels, e.g., channels carrying transmissions from the wireless terminals to the base stations, in accordance with the invention, from the method employed for the downlink channels, e.g., channels carrying transmissions from the base stations to the wireless terminals. The wireless terminals use the uplink tone allocation hopping method of the present invention along with information received from the base station, e.g. channel segment assignments, base station ID, sector ID information, to determine the tones that they can use to transmit data and information at specific allocated times. The uplink tone hopping sequence construction is structured, in accordance with the invention to spread the inter-sector and inter-cell interference across all the tones.

Figure 2:
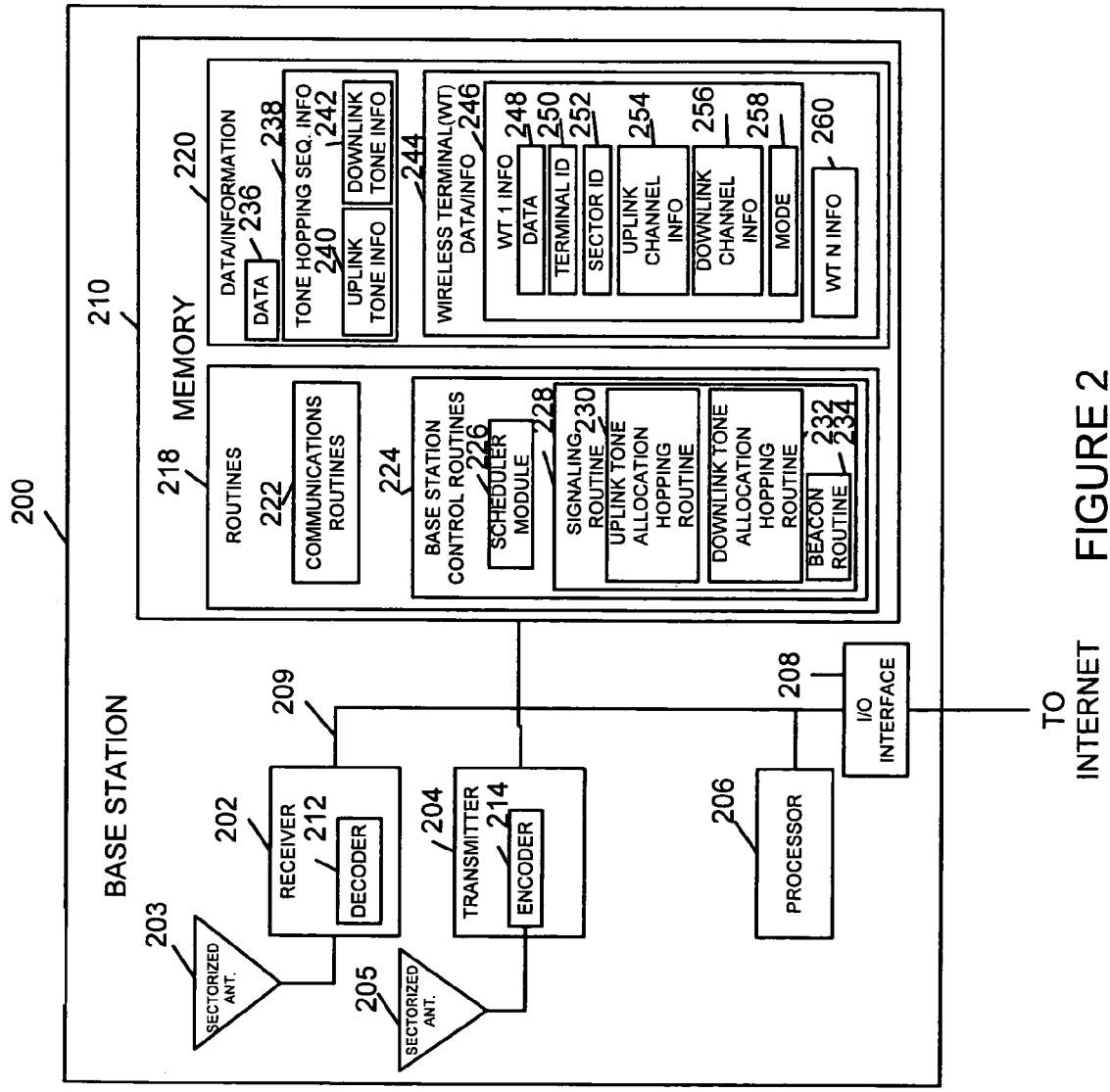
FIG. 2 illustrates an exemplary base station, suitable for use in the system of FIG. 1, implemented in accordance with the present invention.

FIG. 2 illustrates an exemplary base station 200 in accordance with the present invention. Exemplary base station 200 implements the uplink tone hopping sequences of the present invention, with different uplink tone hopping sequences generated for each different sector type of the cell. The base station 200 may be used as any one of the base stations 106, 108 of the system 100 of FIG. 1. The base station 200 includes a receiver 202, a transmitter 204, a processor, e.g., CPU 206, an input/output interface 208, which are coupled together by a bus 209 over which the various elements 202, 204, 206, 208, and 210 may interchange data and information.

Sectorized antenna 203 coupled to receiver 202 is used for receiving data and other signals, e.g., channel reports, from wireless terminals transmissions from each sector within the base station's cell. Sectorized antenna 205 coupled to transmitter 204 is used for transmitting data and other signals, e.g., control signals, pilot signal, beacon signals, etc. to wireless terminals 300 (see FIG. 3) within each sector of the base station's cell. In various embodiments of the invention, base station 200 may employ multiple receivers 202 and multiple transmitters 204, e.g., an individual receivers 202 for each sector and an individual transmitter 204 for each sector. The processor 206, may be, e.g., a general purpose central processing unit (CPU). Processor 206 controls operation of the base station 200 under direction of one or more routines 218 stored in memory 210 and implements the methods of the present invention. I/O interface 208 provides a connection to other network nodes, coupling the BS 200 to other base stations, access routers, AAA server nodes, etc., other networks, and the Internet. Memory 210 includes routines 218 and data/information 220.

Data/information 220 includes data 236, tone hopping sequence information 238 including uplink tone information 240 and downlink tone information 242, and wireless terminal (WT) data/info 244 including a plurality of WT information: WT 1 info 246 and WT N info 260. Each set of WT info, e.g., WT 1 info 246 includes data 248, terminal ID 250, sector ID 252, uplink channel information 254, downlink channel information 256, and mode information 258.

Routines 218 include communications routines 222 and base station control routines 224. Base station control routines 224 includes a scheduler module 226 and signaling routines 228 including an uplink tone allocation hopping routine 230, a downlink tone allocation hopping routine 232, and a beacon routine 234.

Data 236 may include data to be transmitted that will be sent to encoder 214 of transmitter 204 for encoding prior to transmission to WTs, and received data from WTs that has been processed through decoder 212 of receiver 202 following reception. Uplink tone hopping information 240 may include a carrier frequency assigned to the base station 200, indices for logical tones, the number of tones in the uplink hopping sequence, indices and frequencies of physical tones in the uplink hopping sequence, dwell interval, e.g. duration of time to remain on a physical tone before hopping, duration of the uplink hopping sequence before resetting and restarting hopping sequence, duration of a super slot, information defining relationship between beacon signal and super slots, and a cell slope value. Downlink tone info 242 may include information including a carrier frequency assigned to the base station 200, the number and frequency of tones in the downlink hopping sequence and cell specific values such as slope.

Data 248 may include data that WT1 300 has received from a peer node, data that WT 1 300 desires to be transmitted to a peer node, and downlink channel quality report feedback information. Terminal ID 250 is a base station 200 assigned ID that identifies WT 1 300. Sector ID includes information identifying the sector in which WT1 300 is operating. Uplink channel information 254 includes information identifying channel segments that have been allocated by scheduler 226 for WT1 300 to use, e.g., uplink traffic channel segments for data, dedicated uplink control channels for requests, power control, timing control, etc. Each uplink channel assigned to WT1 300 may include one or more logical tones, each logical tone following an uplink hopping sequence in accordance with the present invention. Downlink channel information 256 includes information identifying channel segments that have been allocated by scheduler 226 to carry data and information to WT1 300, e.g., downlink traffic channel segments for data. Each downlink channel assigned to WT1 300 may include one or more logical tones, each following a downlink hopping sequence. Mode information 258 includes information identifying the state of operation of WT1 300, e.g. sleep, hold, on.

Communications routines 222 control the base station 200 to perform various communications operations and implement various communications protocols.

Base station control routines 224 are used to control the base station 200 to perform basic base station functional tasks, e.g., signal generation and reception, scheduling, and to implement the steps of the method of the present invention including processing received signals from wireless terminals using the uplink tone hopping sequences of the present invention.

Scheduler module 226 allocates downlink and uplink channel segments to WTs 300. In the downlink, each of the sectors of the cell may be synchronized in terms of the downlink hopping sequences for each logical tone, and the power levels applied to corresponding channels segments in adjacent sectors can be controlled. The downlink hopping sequence synchronization, results in the same logic tones in adjacent sectors of the same cell having an identical hopping pattern; therefore, they may collide with each other at every time instance. In the downlink, the scheduler 226 attempts to maintain acceptable Signal-to-Noise Ratio at the wireless terminals 300 by utilizing channel quality report feedback information. The feedback information, may be, e.g. feedback from a WT 300 reporting on the received pilot signals or beacon signals transmitted by base station 200. This feedback information can provide knowledge of the channel noise curve, including both ambient noise and interference noise, at the WT 300, and thus provide scheduler 226 with a determination of the levels of downlink base station transmission power required to achieve acceptable SNR at the WT 300. Then, scheduler 226 can match the WT 300 to an appropriate segment with the required base station sector transmission power level. However, in the uplink, a number of different WTs 300 will be transmitting at different power levels, with varying levels of interference. In the uplink, it is harder to categorize and group WTs 300, e.g., mobiles, in terms of boundary/non-boundary criteria. It is impractical for individual WTs 300, with limited power and air link resources, to transmit high power signals such as pilot tones on a coordinated and periodic basis, for measurement purposes. In addition, many downlink channels convey large coding blocks, which may employ effective error detection and correction techniques to handle transmission errors. In comparison, many uplink channels, are dedicated control channels which are small and unsuitable for robust error detection and correction coding methods employed on the downlink. It is undesirable for these small dedicated uplink channels to use up capacity or power for measurement purposes. These small dedicated uplink channels by their size, are vulnerable to errors, especially from strong and persistent interference. Based upon the above discussion, it is evident that the inter-sector and inter-cell interference in the uplink can not be managed by using the downlink methods employed of downlink tone hopping synchronized between sectors, WT SNR determination through quality channel reports, and base station transmission power matching. Therefore, in the uplink, it is desirable to spread the uncontrollable inter-sector and inter-cell interference across all the tones to have diversity gain. The scheduler 226 assigns WTs 300 uplink channel segments in which the logical tones hop between physical tones using uplink hopping sequences, with different sequences generated for adjacent sectors and cells in accordance with the uplink hopping sequence formula of the present invention to randomize interference on the uplink experienced by an individual WT 300.

Signaling routines 228 controls the operation of receiver 202 with its decoder 212 and transmitter 204 with its encoder 214. The signaling routines 228 are responsible controlling the generation and detection of transmitted data 236 and control information. Uplink tone allocation hopping routine 230 constructs uplink hopping sequences in accordance with the present invention using the method of the present invention and data/info 220 including uplink tone info 240, sector ID 252, and uplink channel info 254. The uplink tone hopping sequences will be different for each sector type in a cell and different for adjacent cells. The WTs 300 transmit signals in accordance with the uplink hopping sequences; the base station 200 uses the same uplink hopping sequences in order to process the received data. Downlink tone allocation hopping routine 232 constructs downlink tone hopping sequences using information including downlink tone information 242, and downlink channel information 256. The downlink data tone hopping sequences are synchronized across the sectors of a cell. Beacon routine 234 controls the transmission of a beacon signal, e.g., a signal of relatively high power signal concentrated on one or a few tones, that may be used for synchronization purposes, e.g., to synchronize an uplink hopping sequence with respect to a super-slot boundary. In some embodiments beacon signals and/or pilot tone signals are used to communicate cell identification information, e.g., a slope value, and/or sector identification information and/or sector type identification information; the beacon and/or pilot signals are generated and transmitted by the base station sector transmitters.

Figure 3:
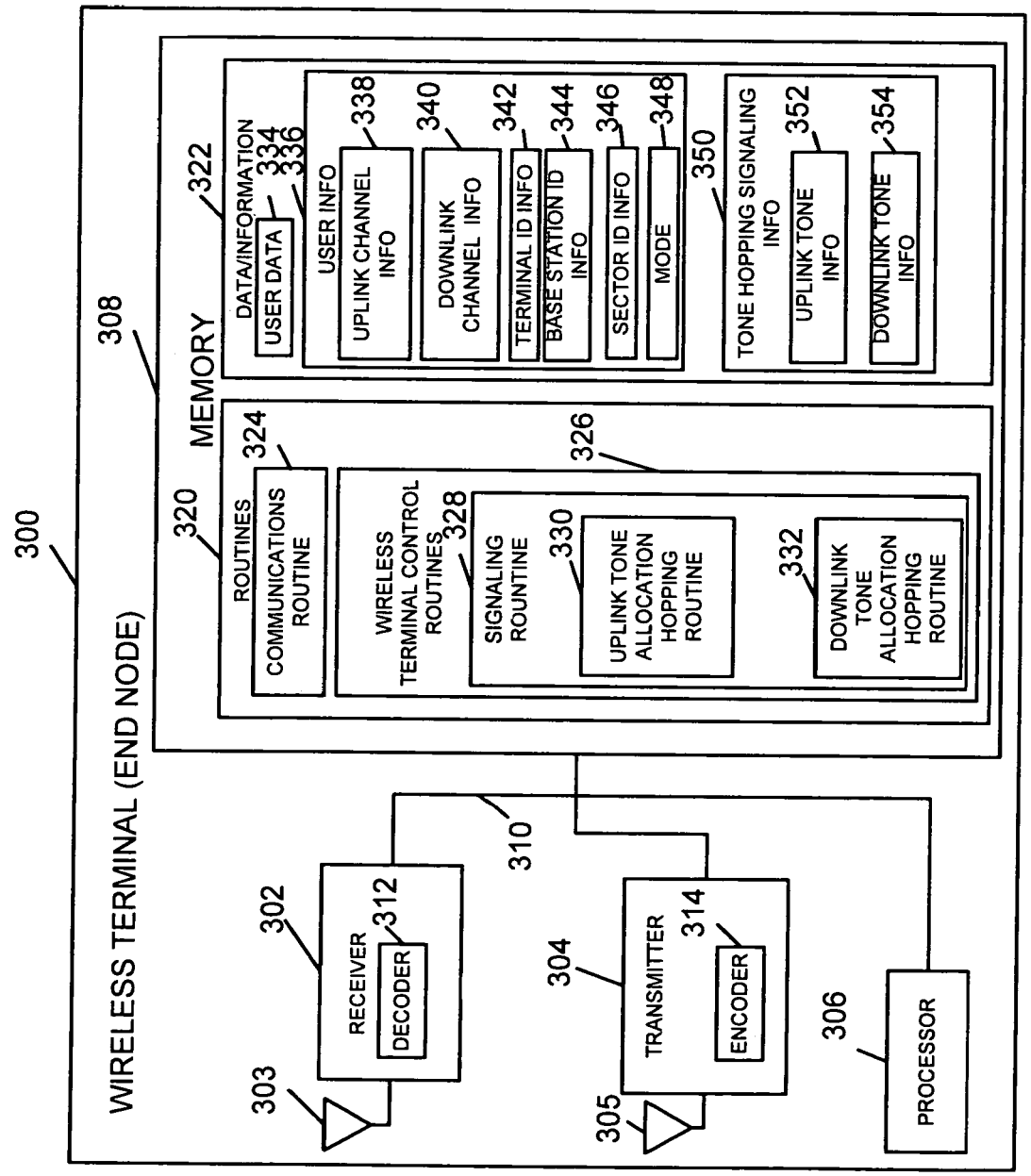
FIG. 3 illustrates an exemplary wireless terminal, suitable for use in the system of FIG. 1, implemented in accordance with the present invention.

FIG. 3 illustrates an exemplary wireless terminal (end node) 300 which can be used as any one of the wireless terminals (end nodes), e.g., EN(1) 136, of the system 100 shown in FIG. 1. Wireless terminal 300 implements the uplink tone hopping sequences, in accordance with the present invention. The wireless terminal 300 includes a receiver 302 including a decoder 312, a transmitter 304 including an encoder 314, a processor 306, and memory 308 which are coupled together by a bus 310 over which the various elements 302, 304, 306, 308 can interchange data and information. An antenna 303 used for receiving signals from a base station 200 is coupled to receiver 302. In some embodiments beacon signals and/or pilot tone signals are received and processed to obtain cell identification information, e.g., a slope value, and/or sector identification information and/or sector type identification information. An antenna 305 used for transmitting signals, e.g., to base station 200 is coupled to transmitter 304.

The processor 306 controls the operation of the wireless terminal 300 by executing routines 320 and using data/information 322 in memory 308.

Data/information 322 includes user data 334, user information 336, and tone hopping sequence information 350. User data 334 may include data, intended for a peer node, which will be routed to encoder 314 for encoding prior to transmission by transmitter 304 to base station 200, and data received from the base station 200 which has been processed by the decoder 312 in receiver 302. User information 336 includes uplink channel information 338, downlink channel information 340, terminal ID information 342, base station ID information 344, sector ID information 346, and mode information 348. Uplink channel information 338 includes information identifying uplink channels segments that have been assigned by base station 200 for wireless terminal 300 to use when transmitting to the base station 200. Uplink channels may include uplink traffic channels, dedicated uplink control channels, e.g., request channels, power control channels and timing control channels. Each uplink channel include one or more logic tones, each logical tone following an uplink tone hopping sequence in accordance with the present invention. The uplink hopping sequences are different between each sector type of a cell and between adjacent cells. Downlink channel information 340 includes information identifying downlink channel segments that have been assigned by base station 200 to WT 300 for use when BS 200 is transmitting data/information to WT 300. Downlink channels may include downlink traffic channels and assignment channels, each downlink channel including one or more logical tone, each logical tone following a downlink hopping sequence, which is synchronized between each sector of the cell.

User info 336 also includes terminal ID information 342 which is a base station 200 assigned identification, base station ID information 344 which identifies the specific base station 200 that WT has established communications with, and sector ID info 346 which identifies the specific sector of the cell where WT 300 is presently located. Base station ID 344 provides a cell slope value and sector ID info 346 provides a sector index type; the cell slope value and sector index type may be used to derive the uplink tone hopping sequences in accordance with the invention. Mode information 348 also included in user info 336 identifies whether the WT 300 is in sleep mode, hold mode, or on mode.

Tone hopping signaling information 350 includes uplink tone information 352 and downlink tone information 354. Uplink tone hopping information 352 may include a carrier frequencies assigned to base stations 200, indices for logical tones, the number of tones in the uplink hopping sequence, indices and frequencies of physical tones in the uplink hopping sequence, dwell interval, e.g., duration of time remain to on a physical tone before hopping, duration of the uplink hopping sequence before resetting and restarting the hopping sequence, duration of a super slot, information defining the relationship between beacon signals and super slots, and cell slope values corresponding to each base station. Downlink tone info 354 may include information including a carrier frequencies assigned to base stations 200, the number and frequency of tones in the downlink hopping sequence and cell specific values such as slope.

Routines 320 include communications routines 324 and wireless terminal control routines 326. Communications routines 324 control the various communications protocols used by WT 300. Wireless terminal control routines 326 controls basic wireless terminal 300 functionality including the control of the receiver 302 and transmitter 304. Wireless terminal control routines 326 also includes the signaling routines 328 including a downlink tone allocation hopping routine 332 and an uplink tone allocation hopping routine 330. Downlink tone allocation hopping routine 330 uses user data/info 322 including downlink channel information 340, base station ID info 344, e.g., slope, and downlink tone information 354 in order to generate the downlink tone hopping sequences and process received data transmitted from base station 200. Uplink tone allocation hopping routine 330 uses data/information 332 including uplink channel information 338, base station ID information 344, sector ID information 346, and uplink tone information 352 to generate uplink tone hopping sequences in accordance with the present invention. Uplink tone allocation hopping routine 330, when executed by processor 306, is used to determine when and on which tones the wireless terminal 300 is to transmit one or more signals to the base station 200 with which the wireless terminal 300 is registered. The uplink tone allocation hopping routine 330 uses a hopping function, implemented in accordance with the present invention, along with information received from the base station 200, to determine the tones in which it should transmit.

Figure 4:
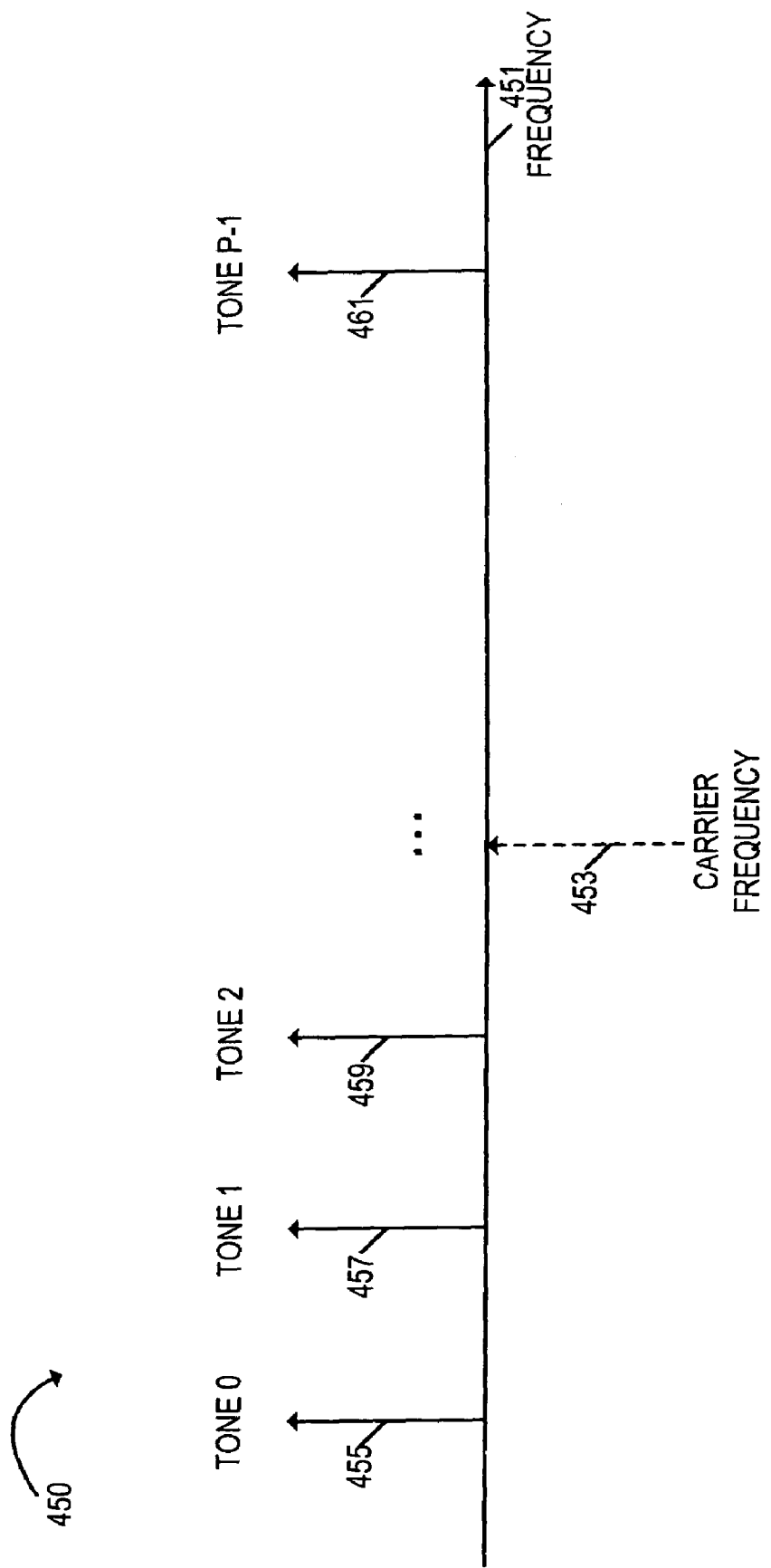
FIG. 4 illustrates examples of exemplary tones in an OFDM system.

FIG. 4 illustrates the OFDM spread spectrum air interface technology of the present invention, implemented for each sector of each of the cells (102,104) of FIG. 1. In FIG. 4, horizontal axis 451 represents frequency. The total amount of available bandwidth for a particular carrier frequency 453, e.g., for uplink signaling, is divided into a number, P, of equally spaced tones. In some embodiments, there are 113 equally spaced tones. These tones are indexed from 0 to P−1. Exemplary tones: tone 0 455, tone 1 457, tone 2 459 and tone P−1 461 are illustrated in FIG. 4. The bandwidth is used simultaneously each of the sectors 110, 112, 114, 122, 124, 126 comprising the two cells 102, 104. In each sector of each cell, the tones, 0 through P−1, are allocated between the wireless terminals 300 in each sector of each cell respectively, for use in transmitting uplink signals. Since the same bandwidth is used in each sector of both the cells 102, 104, the signals transmitted by WT 300 on the frequency tones at the same time may interfere with each other, e.g., in the overlapping coverage areas, e.g. sector boundary areas 116, 118, 120, 128, 130, 132, and cell boundary areas 168.

In accordance with the invention, the tones of the OFDM spread spectrum system used by a particular wireless terminal 300 during uplink in a sector of the cell achieve frequency diversity and average interference between adjacent sectors and neighboring cells by hopping over the available frequency bandwidth. The available tones in each sector 110, 112, 114 of cell 102 that are allocated to a wireless terminal 300 change, i.e., hop, according to uplink tone hopping sequences that are unique for each sector type in accordance with the present invention. Moreover, in adjacent cells, e.g. cell 104, the tones allocated to wireless terminals 300 hop according to different uplink tone hopping sequences in accordance with the present invention. This avoids the problem of prolonged periods of interference that might result if devices in neighboring sector and/or cells used identical tone hopping sequences.

The uplink tone hopping sequence of the present invention is formulated as:

$$f_s^T(j,k) = s/((1/j) + T*k + k^2)$$

which represents a hopping sequence for a logical tone j at a time indicated by k.

where:

s=the cell slope value, and is the same for each of the sectors of the cell; adjacent cells should have different values for the cell slope value.

T=sector type value. Assume sector type T is in the set {0, 1, 2}; adjacent sectors should have different values of T. In some embodiments, e.g., with more than 3 sectors per cell, T=mod(sector ID, 3). In some such embodiments, sector ID is an index value of the sector with the value being within the range 0, . . . , 5 and with each sector of the same cell having a different sector ID value.

$f_s^T$=a particular function in a sector with sector type T, of a cell with slope value s.

j=a logical tone and may be referred to as an index of a hopping sequence.

k=a measure of time referred to as a dwell index; a dwell represents the interval in time that a logical tone j remains on a specific physical tone before hopping to another physical tone.

Operations in the right side of the above equation are defined in a modular sense, GF (N), where mod(X/Y, N)=Z, for Y not equal to 0

Z ∈ [0, 1, . . . N−1]

$$Mod(Y*Z, N) = X$$

and mod(X/Y, N) is defined equal to 0, for Y=0.

Note: GF is an abbreviation for Galois Field.

Examples of the tone allocations of uplink hopping sequences in accordance with the equation of the present invention are provided in matrix 400 of FIG. 5. For the examples of FIG. 5, let N=5, where N represents the number of tones, and N is the modular operator such that outputs from each modular operation are in the range of [0, 1, . . . N−1]. Consider s=2, where s=cell slope value. Consider T=1, where T=sector type index. Let F(j,k) be the frequency tone index of the jth hopping sequence at time k. j=0, 1, . . . , N−1. The periodicity of the hopping sequences is N, Thus k=0, 1, . . . , N−1.

Matrix 400 of FIG. 5 is described below.

First row 402 provides the (j=0) hopping sequence for logical tone 0.

Second row 404 provides the (j=1) hopping sequence for logical tone 1.

Third row 406 provides the (j=2) hopping sequence for logical tone 2.

Fourth row 408 provides the (j=3) hopping sequence for logical tone 3.

Fifth row 410 provides the (J=4) hopping sequence for logical tone 4.

First column 412 provides each of the five hopping sequence values at time k=0.

Second column 414 provides each of the five hopping sequence value at time k=1.

Third column 416 provides each of the five hopping sequence value at time k=2.

Fourth column 418 provides each of the five hopping sequence value at time k=3.

Fifth column 420 provides each of the five hopping sequence value at time k=4.

The first row 402 of uplink hopping sequence matrix 400 shall be described in detail for purposes of illustration. Considering the first row 402, logical tone 0 (j=0) occupies physical tone 0 during the first interval of time, k=0 (column 412). Then logical tone 0 (j=0) hops to physical tone 1, which it occupies for the second interval of time, k=1 (column 414). Next, logical tone 0 (j=0) hops to physical tone 2, which it occupies for the third interval of time k=2 (column 416). Then, logical tone 0 (j=0) hops to physical tone 1, which it occupies for the fourth interval of time k=3 (column 418). Next, logical tone 0 (j=0) hops to physical tone 0, which it occupies for the fifth interval of time k=4 (column 420). The second row 404 through the fifth row 410 may be interpreted in a similar manner to the description provided for first row 402, and thus shall not be described further. An uplink channel may include one or more logical tones, e.g. an exemplary uplink channel may include second row 404 j=1 (logical tone 1) and fourth row 408 j=3 (logical tone 3).

In order to demonstrate the computation of the values of the uplink tone hopping matrix of FIG. 5, consider the element in the third row 406 (j=2) and the fifth column 420 (k=4). F(2, 4)=s/[(1/j)+T*k+k*k]=2/[(½)+1*4+4*4], where the operations are in modular GF(N) with N=5 mod((½), 5)=3 since mod(2*3, 5)=1, mod(1*4, 5)=mod(4, 5)=4, mod(4*4, 5)=mod(16, 5)=1, mod(3+4+1, 5)=mod(8, 5)=3, F(2,4)=mod(⅔, 5)=mod(2*⅓, 5)

Where mod(⅓, 5)=2, since mod(3*2, 5)=1

F(2,4)=mod(2*2, 5)=mod(4, 5)=4

In some embodiments of the invention, the uplink hopping sequences implemented in an exemplary system defined by equation:

$$f_s^T(j,k) = s/((1/j) + T*k + k^2),$$

where operations in the above equation are in GF(113), and k may be further defined by the equation:

$$k = (L \bmod 4) \times 15 + [(t-9)/7]$$

where:

s=the cell slope value, and is the same for each of the sectors of the cell; adjacent cells should have different values for the cell slope value.

T=sector type the sector. Assume sector type T is in the set $\{0, 1, \ldots, 3\}$; adjacent sectors should have different values of T.

$f_s^T$=a particular function in a sector with sector index T, of a cell with slope value s.

j=a logical tone and may be referred to as an index of a hopping sequence.

k=the dwell index in 4 superslots: if t is the symbol index inside a superslot, t=9 . . . 113.

L=the superslot index relative to the beacon signal of the cell, and L ranges from 0 . . . 7.

Superslot=the interval of repetition of a downlink hopping sequence including 114 OFDM symbol times, with symbol indexes ranging from 0 . . . 113.

[(t−9)/7] is a floor function $f_{FL}$, such that if the input is defined=(t−9)/7, the output of the floor function will be the largest integer smaller than or equal to the input number. For example for t=9 . . . 15, $f_{FL}$=0; for t=16 . . . 22, $f_{FL}$=1; for t=23 . . . 29, $f_{FL}$=2.

In the above embodiment, the number of tones is 113, and the uplink tone hopping sequences repeat every 60 tone allocation periods. The tone hopping sequences would have repeat every 113 tone allocation periods, but are truncated. The length of the tone hopping sequence period is equal to 4 superslots. In each superslot, there are 15 tone allocation periods, and in additional 9 symbol periods in which the tone allocation operation is suspended.

The hopping sequences constructed, in accordance with the present invention as described above, have the following properties:

In every four super-slots, for any two logical tones, $\text{tone}_{iA}$ and $\text{tone}_{jB}$, in sector A and B, respectively, where sectors A and B have different sector type values, their mapped physical tones structured in dwells, overlap:

(1) at most once if A,B are in the same cell.

(2) at most twice if A,B are in different cells.

Figure 6:
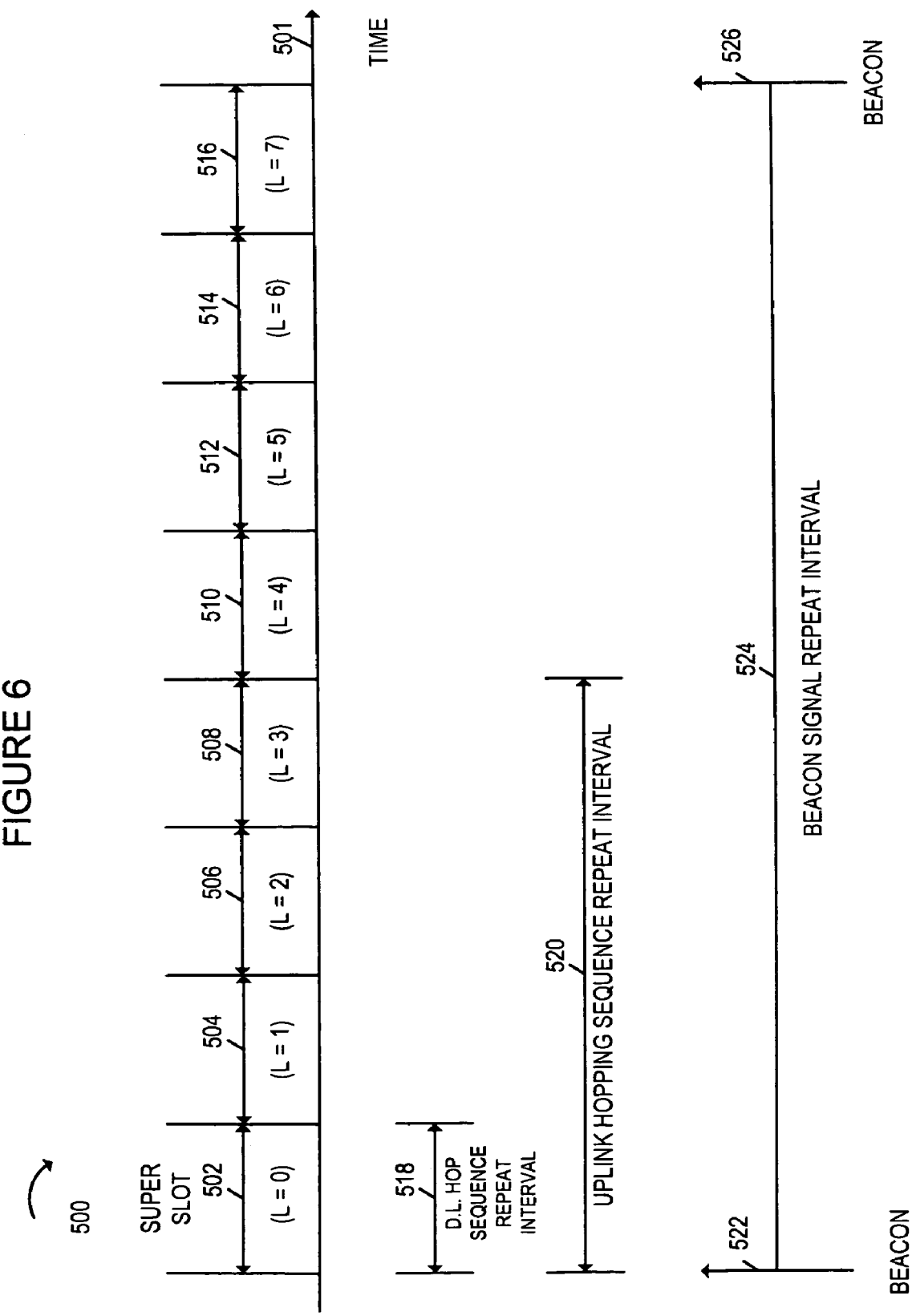
FIG. 6 illustrates the timing relationship between super-slots, beacon signals, downlink hopping sequences, and uplink hopping sequences in accordance with an exemplary embodiment of the invention.

FIG. 6 illustrates via drawings 500 the timing relationship between superslots, beacon signals, downlink hopping sequences, and uplink hopping sequences for an exemplary embodiment of the invention as described above. Horizontal axis 501 represents the time domain. Two exemplary beacon signals 522, 526 are shown separated by a beacon signal repeat interval of time 524. Beacon 522 can be considered as part of a first beacon slot while beacon 526 can be considered part of a second beacon slot. The beacon signal repeat interval of time 524 may be subdivided into eight superslots: super-slot with index L=0 502, super-slot with index L=1 504, super-slot with index L=2 506, super-slot with index L=3 508, super-slot with index L=4 510, super-slot with index L=5 512, super-slot with index L=6 514, super-slot with index L=7 516. Each downlink hopping sequence repeat interval 518 matches one super-slot, while each uplink hopping sequence repeat interval 520 repeats after 4 super-slots. In some embodiments, there is an offset, e.g., a fixed predetermined timing offset from the base station perspective, between the uplink and downlink timing structure.

Figure 7:
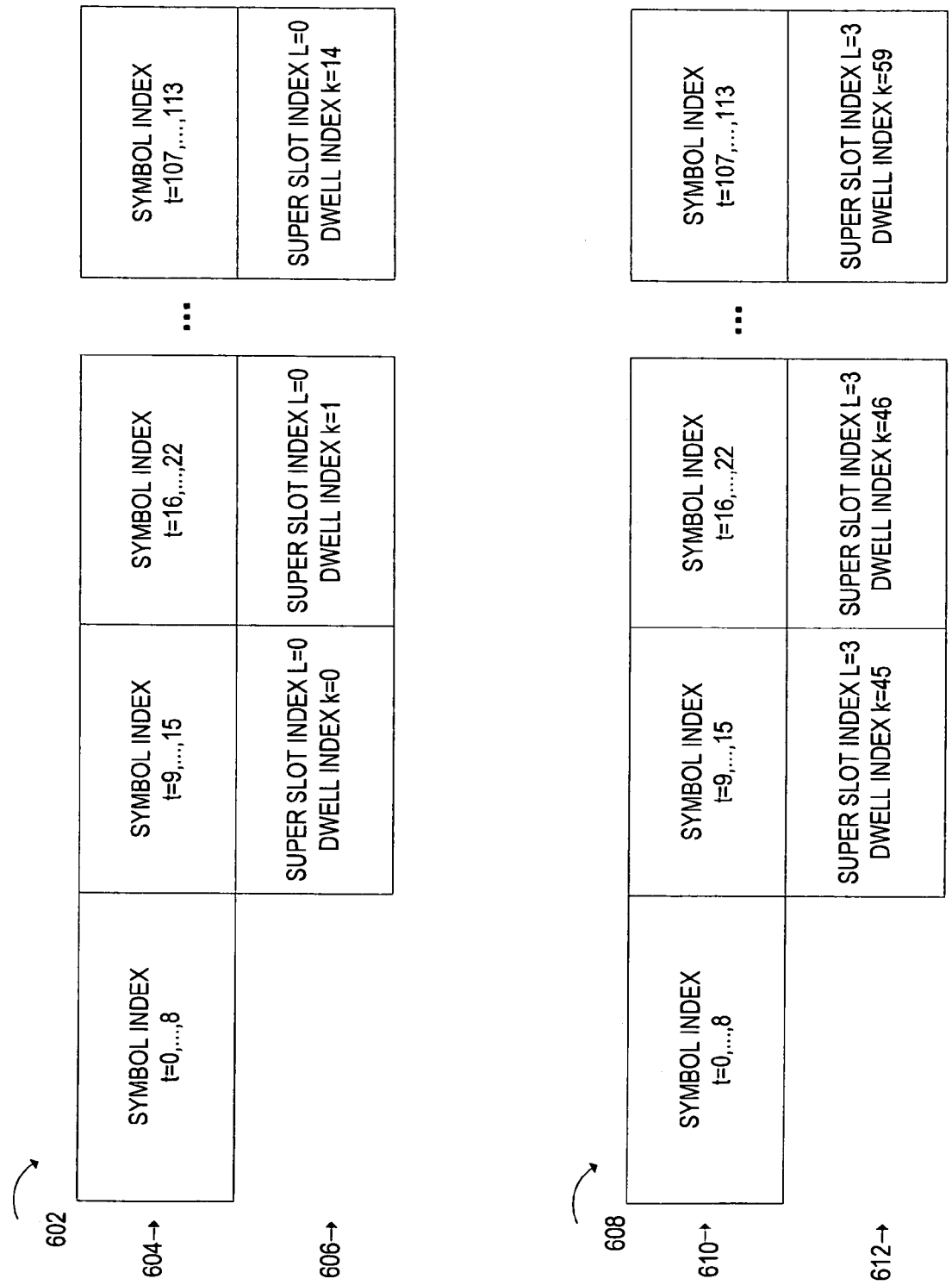
FIG. 7 illustrates the relationship between OFDM symbol times and dwell index in accordance with an exemplary embodiment of the present invention.

FIG. 7 illustrates the relationship between OFDM symbol times in super-slots and dwell index in an exemplary embodiment of the invention as described above. Drawing 602 corresponds to a first superslot (L=0) 502 of FIG. 5 relative to the beacon slot 524. Row 604 lists the OFDM symbol time index, ranging from 0 . . . 113, during each subdivided portion of the super slot 502. The second row 606 lists the calculated value for k, the dwell index in each subdivided portion of the first superslot 502. By comparing rows 604 and 606, it may be observed that the uplink hopping sequence does not apply to the first 9 symbols times (t=0, . . . , 8) of the superslot. The remaining symbol times (t=9, . . . , 113) of the superslot are subdivided into dwells, each dwell having a duration of 7 symbol times, and each dwell representing the interval of time that physical tones remain assigned to logical tones before being hopped via the uplink hopping functions. Similarly, drawing 608 corresponds to a fourth superslot (L=3) 508. Row 610 lists the OFDM symbol time index, ranging from 0 . . . 113, during each subdivided portion of the super slot 508. The second row 612 lists the calculated value for k, the dwell index in each subdivided portion of the fourth superslot 508.

Various embodiments of the invention may use different numbers of tones, different numbers of super-slots between beacon signals, different dwell intervals, different number of symbol transmissions prior to the start of the first dwell in each superslot, and may select a different point to terminate and restart the uplink hopping sequence than those described above. In addition, other embodiments of the invention, may not use a beacon signal, and may rely on other methods for synchronization, e.g. pilot signals. In some embodiments the downlink and uplink hopping sequences shall not be synchronized.

The functions of the present invention may be implemented using hardware, software of a combination of hardware and software. Tone allocation charts may be computed once and stored in the base station 200 and/or wireless terminals 300 so that re-computing of the allocation information need not be performed on a continuous basis. In such embodiments, allocation of tones and tone sequences is still performed according to the functions even though the functions are not performed in real time during the allocation process.

Figure 8:
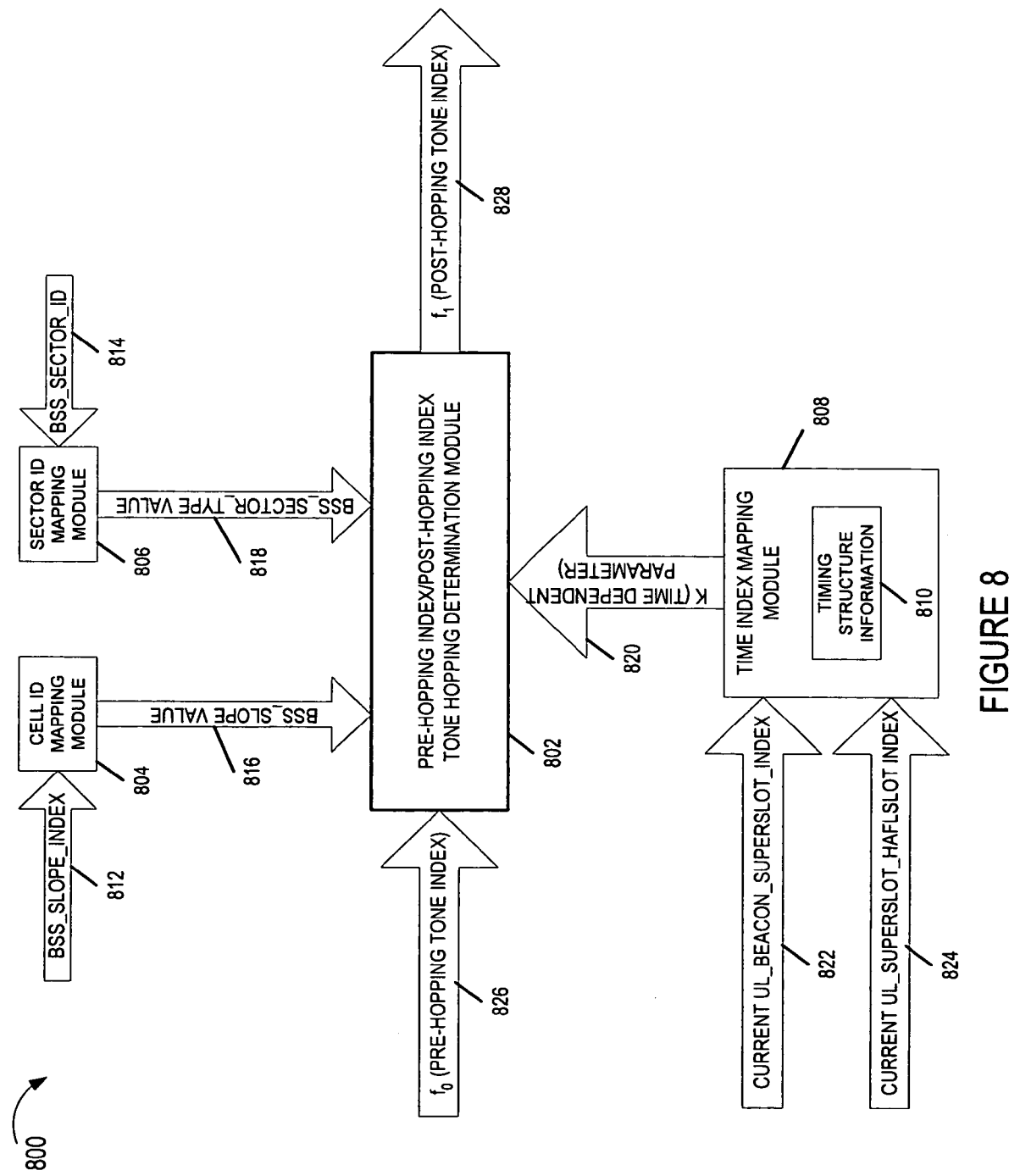
FIG. 8 is a drawing of an exemplary uplink tone hopping module implemented in accordance with the present invention and using methods of the present invention.

FIG. 8 is a drawing of an exemplary uplink tone hopping module 800 implemented in accordance with the present invention and using methods of the present invention. A base station is a network access point for a wireless terminal to obtain network connectivity through the air interface. A base station includes one or multiple Base Station Sectors (BSSs). A BSS is a part of a base station. An omni BSS provides service to wireless terminals in the entire cell corresponding to the base station. A directional BSS may use antennas of a particular direction to communicate with wireless terminals in a subset portion of the cell, e.g., a sector of the cell.

Module 800 may be included as part of a base station or wireless terminal and is used to determine the uplink tone hopping pattern that should be used within a sector of a cell corresponding to a BSS. Exemplary uplink tone hopping module 800 includes a pre-hopping index to post-hopping index tone hopping determination module 802, a cell identification mapping module 804, a sector identification mapping module 806, and a time index mapping module 808.

A BS may have a BS identifier associated with a BSS_slope_index 812. Different sectors of a cell will, in some embodiments, use the same BSS_slope_index 812. A given BSS in the communications system has a corresponding BSS_slope_index 812, and a BSS_sector_ID 814. The cell ID mapping module 804 maps the BSS_slope_index 812 to a BSS_slope value. Multiple BSSs corresponding to the same cell will have the same value for BSS_slope. Adjacent cells will have different values of BSS_slope.

The cell ID mapping module 804 performs the conversion from BSS_slope_index 812 to BSS slope value 816, e.g., via a look up table. In some embodiments, the set of valid BSS_slope_index are integer values within the range of 0:95. In some such embodiments, the set of valid BSS_slope_index values is the set {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95} and the respective corresponding set of BSS_slope values is the set of values {7, 8, 6, 36, 35, 105, 39, 74, 18, 95, 9, 73, 93, 102, 11, 34, 10, 104, 94, 103, 106, 5, 40, 91, 77, 46, 19, 92, 17, 67, 64, 101, 20, 96, 45, 65, 68, 63, 78, 107, 76, 44, 66, 62, 90, 61, 33, 48, 16, 21, 72, 37, 49, 12, 79, 89, 69, 47, 4, 22, 38, 97, 50, 51, 108, 60, 100, 41, 23, 32, 75, 15, 52, 80, 13, 88, 43, 24, 98, 3, 31, 109, 71, 59, 81, 53, 70, 87, 25, 99, 42, 110, 82, 14, 2, 54}.

A BSS also has an associated BSS_sector_identifier 814. Each sector of the cell has a different BSS_sector_ID 814. Different BSSs of the same BS may have the same BSS_sector_type 818. However, adjacent BSSs of the same BS, in a preferred embodiment, do not have the same BSS_sector_type. The sector ID mapping module 806 maps the BSS_sector_ID 814 to a BSS_sector_type value 818. In some embodiments, the BSS_sector_type value=mod (BSS_sector_ID, 3). In some such embodiments, the BSS_sector_ID is an interger value in the range 0 . . . 5, while the BSS_sector_type is an integer value in the range 0 . . . 2.

In some embodiments, for a given BSS in the communications system, the values for BSS_slope 816 and BSS_sector type 818 are fixed and do not vary with time.

In some such embodiments, a wireless terminal which desires to use a BSS as its attachment point determines the BSS_slope value and BSS_sector_type value corresponding to the BSS, and then uses these values to control uplink hopping.

Time index mapping module 808 includes timing structure information 810. The timing structure information 810 identifies the downlink and uplink timing structure information associated with each BSS, e.g., OFDM symbol timing, and various grouping of OFDM symbols such as half slots, slots, superlots, beacon slots, ultra slots, etc, as well as indexing information associated with the groupings. The time index mapping module 808 receives a current uplink_beacon_superslot_index value 822 and a current uplink_superslot_half-slot index value 824 and determines a time dependent value K 820. In some embodiments, K is the value of the index value of the dwell within a repetitive uplink timing structure for which the uplink tone hopping applies. For example K may be an integer value in the range of 0 . . . 59. The current uplink_beacon_superslot_index value 822 identifies the current superslot index within the current beacon slot within the uplink timing structure corresponding to the BSS. In some embodiments, the value of UL_beacon_superslot_index are integer values ranging from 0 . . . 7. The current UL_superslot_halfslot index 824 identifies the current halfslot within a superslot within the uplink timing structure. In some embodiments, the value of the UL_superslot_halfslot index 824 ranges from 0 . . . 14.

The pre-hopping index/post-hopping index tone hopping determination module 802 receives control inputs BSS_slope value 816, BSS_sector_type value 818 and K value 820. Determination module 802 also receives $f_0$ 826, a pre-hopping tone index, and determines a corresponding post-hopping tone index $f_1$ 828. In some embodiments, a pre-hopping tone index is an integer value in the range 0 . . . 112 and the post-hopping tone index is an integer value in the range 0 . . . 112. Determination module 802 may determine uplink tone hopping for each of the pre-hopping tone index $f_0$ values, e.g., 113 values, 0 ... 112, for a given set of inputs 816, 818, 820, determining a corresponding set of post-hopping tone index $f_1$ values.

Information is communicated on the uplink, e.g., in the form of coded bits being conveyed by values of modulation symbols, e.g., QPSK or QAM modulation symbols. A logical communications channel can include a number of tone-symbols, each tone symbol corresponding to the air link resource of one tone for the duration of one OFDM symbol transmission time interval. A dwell represents an interval of time wherein the tones used for the uplink remain constant. Uplink tone hopping can be employed from one dwell to the next. An uplink timing structure may be represented in terms of logical channels and segments. The tones on the logical channels and segments may be associated with pre-hopping tone index values. The post-hopping tone index values may be the tones actually used for transmission of the modulation symbols following reordering performed in accordance with determination module 802.

In some embodiments, the time index mapping module 808 determines K using the equation K=15*mod(UL_beacon_superslot_index, 4)+(UL_superslot_halfslot_index−1), where UL_beacon_superlot_index is an integer value in the range 0 ... 7, and UL_superslot_halfslot_index is an integer value in the range 1 ... 15. In some such embodiments, the pre-hopping index/post-hopping index tone hopping determination module 802 uses the equation $f_1$=mod(BSS_slope*temp1, 113), where temp1=imod(temp0, 113), where temp0=imod($f_0$, 113)+BSS_sector_type*K+K*K, where $f_0$ is an integer value in the range 0 ... 112.

The function floor(x) is defined as the largest integer less than or equal to x. For integers x and m, the modulo function mod(x, m) is defined as mod(x, m)=x−m*floor(x/m) where m is referred to as the modulus. For integers x and m, the inverse modulo function imod(x, m) is equal to y, where 1≦y≦m, if mod(x*y, m) is equal to 1. If mod(x, m) is zero, then imod(x, m) is set to 0.

Figure 9:
FIG. 9 is a drawing of exemplary uplink timing structure in accordance with an exemplary embodiment of the present invention.

FIG. 9 is a drawing 900 of exemplary uplink timing structure in accordance with an exemplary embodiment of the present invention. Drawing 900 includes an uplink timing structure beaconslot 902 and a corresponding set of 8 successive superslots (uplink_beacon_superslot with index=0 904, uplink_beacon_superslot with index=1 906, uplink_beacon_superslot with index=2 908, uplink_beacon_superslot with index=3 910, uplink_beacon_superslot with index=4 912, uplink beacon superslot with index=5 914, and uplink_beacon_superslot with index=6 916, uplink_beacon_superslot with index=7 918. The timing structure illustrated in FIG. 9 repeats iteratively.

Figure 10:
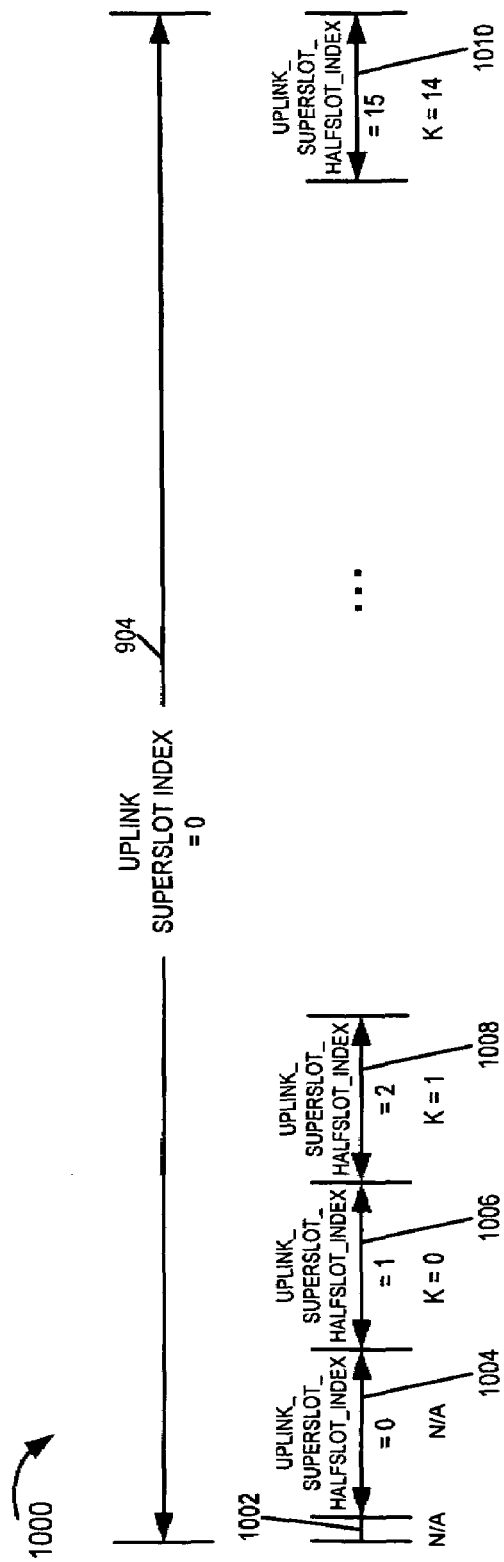

FIG. 10 is a drawing 1000 of exemplary uplink timing structure and determined time dependent K values with respect to that exemplary uplink timing structure, the value K being used as an input in determining the uplink tone hopping in accordance with an exemplary embodiment of the present invention. FIG. 10 includes uplink superslot of index=0 904 and corresponding subdivisions. The subdivisions include a first part 1002, e.g., two successive OFDM symbol transmission time intervals, followed by 16 successive uplink superslot halfslots (uplink_superslot_halfslot with index=0 1004, uplink_superslot_halfslot with index=1 1006, uplink_superslot_halfslot with index=2 1008, ..., uplink_superslot_halfslot with index=15 1010). Each superslot_halfslot is an time interval corresponding to seven successive OFDM symbol transmission time intervals.

The uplink tone hopping of the present invention is applied for the 15 superslot_halfslots of index 1 to 15 (1006, 1008, ..., 1010) with corresponding values of K being 0, 1, ..., 14. It should be noted that the uplink tone hopping sequence is not applicable for the first 9 OFDM symbol transmission time intervals of each superslot in this exemplary embodiment corresponding to intervals 1002 and 1004 for superslot 904. In other embodiments, the region in the uplink timing structure not applicable to the uplink tone hopping sequence may be different.

FIG. 11 is a drawing 1100 of exemplary uplink timing structure and determined time dependent K values with respect to that exemplary uplink timing structure, the value K being used as an input in determining the uplink tone hopping in accordance with an exemplary embodiment of the present invention. FIG. 11 includes uplink superslot of index=1 906 and corresponding subdivisions. The subdivisions include a first part 1102, e.g., two successive OFDM symbol transmission time intervals, followed by 16 successive uplink superslot halfslots (uplink_superslot_halfslot with index=0 1104, uplink_superslot_halfslot with index=1 1106, uplink_superslot_halfslot with index=2 1108, ..., uplink_superslot_halfslot with index=15 1110). The uplink tone hopping of the present invention is applied for the 15 superslot_halfslots of index 1 to 15 (1106, 1108, ..., 1110) with corresponding values of K being 15, 16, ..., 29.

FIG. 12 is a drawing 1200 of exemplary uplink timing structure and determined time dependent K values with respect to that exemplary uplink timing structure, the value K being used as an input in determining the uplink tone hopping in accordance with an exemplary embodiment of the present invention. FIG. 12 includes uplink superslot of index=2 908 and corresponding subdivisions. The subdivisions include a first part 1202, e.g., two successive OFDM symbol transmission time intervals, followed by 16 successive uplink superslot halfslots (uplink_superslot_halfslot with index=0 1204, uplink_superslot_halfslot with index=1 1206, uplink_superslot_halfslot with index=2 1108, uplink_superslot_halfslot with index=15 1210). The uplink tone hopping of the present invention is applied for the 15 superslot_halfslots of index 1 to 15 (1206, 1208, 1210) with corresponding values of K being 30, 31, ..., 44.

FIG. 13 is a drawing 1300 of exemplary uplink timing structure and determined time dependent K values with respect to that exemplary uplink timing structure, the value K being used as an input in determining the uplink tone hopping in accordance with an exemplary embodiment of the present invention. FIG. 13 includes uplink superslot of index=3 910 and corresponding subdivisions. The subdivisions include a first part 1302, e.g., two successive OFDM symbol transmission time intervals, followed by 16 successive uplink superslot halfslots (uplink_superslot_halfslot with index=0 1304, uplink_superslot_halfslot with index=1 1306, uplink_superslot_halfslot with index=2 1308, uplink_superslot_halfslot with index=15 1310). The uplink tone hopping of the present invention is applied for the 15 superslot_halfslots of index 1 to 15 (1306, 1308, 1310) with corresponding values of K being 45, 46, ..., 59.

It should be noted that the exemplary tone hopping pattern of the present invention repeats with a frequency of two iterations per beaconslot. Therefore, the value of K can be observed to repeat starting with uplink superslot index=4.

Figure 14:
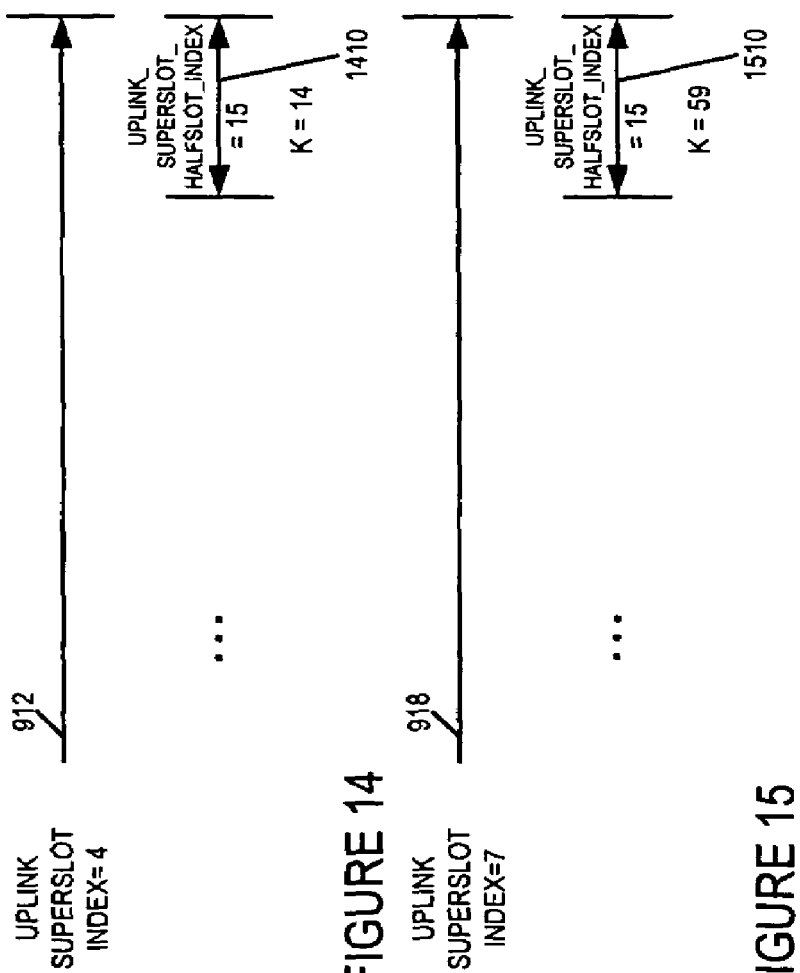

FIG. 14 is a drawing 1400 of exemplary uplink timing structure and determined time dependent K values with respect to that exemplary uplink timing structure, the value K being used as an input in determining the uplink tone hopping in accordance with an exemplary embodiment of the present invention. FIG. 14 includes uplink superslot of index=4 912 and corresponding subdivisions. The subdivisions include a first part 1402, e.g., two successive OFDM symbol transmission time intervals, followed by 16 successive uplink superslot halfslots (uplink_superslot_halfslot with index=0 1404, uplink_superslot_halfslot with index=1 1406, uplink_superslot_halfslot with index=2 1408, uplink_superslot_halfslot with index=15 1410). The uplink tone hopping of the present invention is applied for the 15 superslot_halfslots of index 1 to 15 (1406, 1408, . . . , 1410) with corresponding values of K being 0, 1, . . . , 14.

Figure 15:
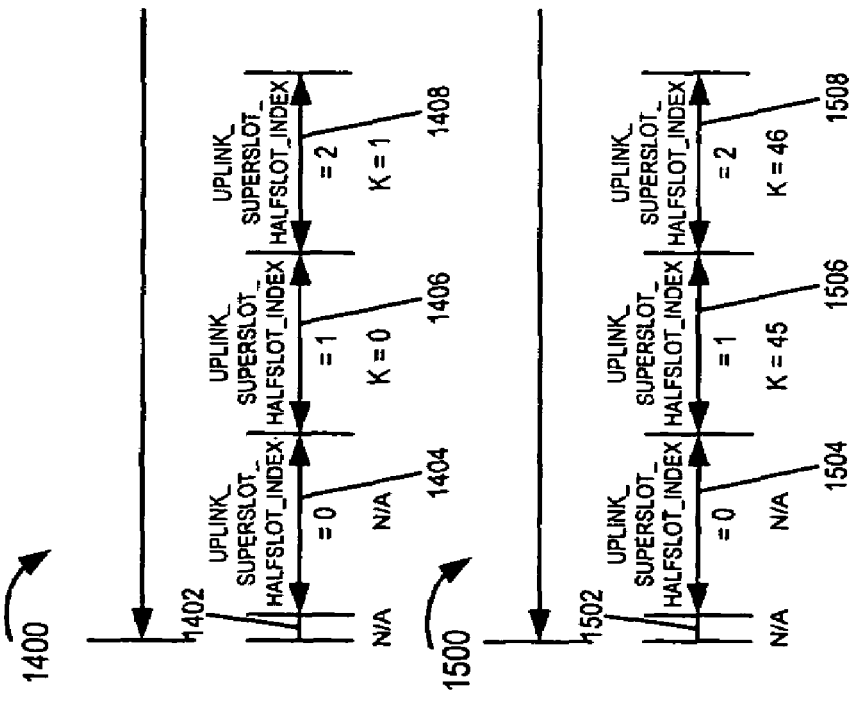

FIG. 15 is a drawing 1500 of exemplary uplink timing structure and determined time dependent K values with respect to that exemplary uplink timing structure, the value K being used as an input in determining the uplink tone hopping in accordance with an exemplary embodiment of the present invention. FIG. 15 includes uplink superslot of index=7 912 and corresponding subdivisions. The subdivisions include a first part 1502, e.g., two successive OFDM symbol transmission time intervals, followed by 16 successive uplink superslot halfslots (uplink_superslot_halfslot with index=0 1504, uplink_superslot_halfslot with index=1 1506, uplink_superslot_halfslot with index=2 1508, uplink_superslot_halfslot with index=15 1510). The uplink tone hopping of the present invention is applied for the 15 superslot_halfslots of index 1 to 15 (1506, 1508, . . ., 1510) with corresponding values of K being 45, 46, . . . , 59.

Examples of tone hopping in accordance with the present invention are presented below for an embodiment using five tones. The calculations are performed using GF(N=5) for this exemplary embodiment. The tone hopping formula used to map logical tones to physical tones is:

$$f_s^T(j,k) = s/((1/j) + T*k + k^2),$$

For N=5, define inverse function as follows: inverse(0)=0, inverse(1)=1, inverse(2)=3, inverse(3)=2, inverse(4)=4.

For a cell with s=2, consider three sectors T=0, T=1, and T=2.

For T=0, the physical tones of logical tones (j=0, . . . , 4) are as follows:

| | k = | | | | |
|---|---|---|---|---|---|
| | 0 | 1 | 2 | 3 | 4 |
| j = 0: | 0 | 2 | 3 | 3 | 2 |
| j = 1: | 2 | 1 | 0 | 0 | 1 |
| j = 2: | 4 | 3 | 1 | 1 | 3 |
| j = 3: | 1 | 4 | 2 | 2 | 4 |
| j = 4: | 3 | 0 | 4 | 4 | 0 |

For T=1, the physical tones of logical tones (j=0, . . . , 4) are as follows:

| | k = | | | | |
|---|---|---|---|---|---|
| | 0 | 1 | 2 | 3 | 4 |
| j = 0: | 0 | 1 | 2 | 1 | 0 |
| j = 1: | 2 | 4 | 1 | 4 | 2 |
| j = 2: | 4 | 0 | 3 | 0 | 4 |
| j = 3: | 1 | 3 | 4 | 3 | 1 |
| j = 4: | 3 | 2 | 0 | 2 | 3 |

For T=2, the physical tones of logical tones (j=0, . . . , 4) are as follows:

| | k = | | | | |
|---|---|---|---|---|---|
| | 0 | 1 | 2 | 3 | 4 |
| j = 0: | 0 | 4 | 4 | 0 | 3 |
| j = 1: | 2 | 3 | 3 | 2 | 0 |
| j = 2: | 4 | 2 | 2 | 4 | 1 |
| j = 3: | 1 | 0 | 0 | 1 | 2 |
| j = 4: | 3 | 1 | 1 | 3 | 4 |

It is clear that one sequence of T=0 collides with another sequence of T=1 only once.

It is clear that one sequence of T=0 collides with another sequence of T=2 only once.

It is clear that one sequence of T=1 collides with another sequence of T=2 only once.

Now, let s=3, T=1. That is, for a different cell with cell identifier s=3 and a sector type identifier T=1, we have

| | k = | | | | |
|---|---|---|---|---|---|
| | 0 | 1 | 2 | 3 | 4 |
| j = 0: | 0 | 4 | 3 | 4 | 0 |
| j = 1: | 3 | 1 | 4 | 1 | 3 |
| j = 2: | 1 | 0 | 2 | 0 | 1 |
| j = 3: | 4 | 2 | 1 | 2 | 4 |
| j = 4: | 2 | 3 | 0 | 3 | 2 |

It is clear that one sequence of s=2 and T=1 collides with another sequence of s=3 and T=1 at most twice.

It is clear that one sequence of s=2 and T=0 collides with another sequence of s=3 and T=1 at most twice.

It is clear that one sequence of s=2 and T=2 collides with another sequence of s=3 and T=1 at most twice.

In some embodiments, the number of tones in a tone block being hopped is a value greater than 100, e.g., 113 tones. In some such embodiments, the operations are performed using GF(113), the tone hopping formula used to map logical tones to physical tones is: $f_s^T(j,k) = s/((1/j) + T*k + k^2)$, the index of the logical tones (j) ranges from 0 to 112 and the index of the physical tones also ranges from 0 to 112. In some embodiments, a portion of the tone hopping sequence is implemented, e.g., hopping the sequence is truncated and restarted.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

While described in the context of an OFDM system, at least some of the methods and apparatus of the present invention, are applicable to a wide range of communications systems including many non-OFDM and/or non-cellular systems.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of implementing tone hopping in a frequency division multiplexed system, said system including at least one cell including multiple sectors, the method comprising the steps of:
   determining a plurality of physical tone indexes, said physical indexes corresponding to physical tones to be used to transmit signals based on a tone hopping function which uses a cell identifier and a sector identifier to control the mapping of logical tones to physical tones as a function of time; and
   transmitting signals using said physical tones corresponding to the determined physical tone indexes.

2. The method of claim 1, wherein said tones are orthogonal frequency division multiplexing (OFDM) tones.

3. The method of claim 2, wherein said determining step is preformed once per dwell, each dwell including a fixed number of consecutive orthogonal frequency division multiplexing (OFDM) time periods.

4. The method of claim 1, wherein determining the plurality of physical tone indexes as a function of time includes using a quadratic time dependent parameter.

5. The method of claim 4, wherein determining the plurality of physical tone indexes as a function of time further includes using a linear time dependent parameter in addition to said quadratic time dependent parameter.

6. The method of claim 5, wherein at least one of said cell and sector identifiers are used to scale at least one of the linear time dependent parameter and said quadratic time dependent parameter.

7. The method of claim 6, wherein said cell and sector identifiers are used in combination to scale one of said linear time dependent parameter and said quadratic time dependent parameter; and
   wherein a single one of said cell and sector identifiers are used to scale the one of said linear time dependent parameter and said quadratic time dependent parameter which is not scaled using said combination of cell and sector identifiers.

8. The method of claim 7, wherein said cell and sector identifiers are integer values.

9. The method of claim 8, wherein said cell identifier is a value from a set of predetermined cell identifier values.

10. The method of claim 9, wherein said sector identifier is a value from a set of predetermined sector type identifier values.

11. The method of claim 3, wherein said tone hopping function is a periodic function having a predetermined period which is independent of both the sector type identifier and cell identifier.

12. The method of claim 11, the method further comprising resetting said linear time dependent parameter on a periodic basis.

13. The method of claim 12, wherein said resetting is performed through the use of at least one modular computation operation.

14. The method of claim 12, wherein said linear time dependent parameter has a different value for each dwell that occurs between a reset.

15. The method of claim 11, where the sector type identifier is different for adjacent sectors of a cell.

16. The method of claim 15, wherein the cell identifier is different for adjacent cells.

17. The method of claim 13, wherein the periodicity of the hopping function is longer than the interval between resets of the linear time dependent parameter.

18. The method of claim 12, wherein the periodicity of the hopping function is longer than the interval between resets of the linear time dependent parameter; and
   wherein for any two sectors of the same cell having different sector types and the same cell identifier, said two sectors including a first sector and a second sector, which each use the same set of logical tone indexes, in the first sector for a first logical tone index and in the second sector for a second logical tone index, during the interval between said occurrence of said resets, with respect to the first sector the first logical tone index will be mapped to a first corresponding physical tone on a dwell by dwell basis and with respect to the second sector the second logical tone index will be mapped to a second corresponding physical tone on a dwell by dwell basis, and wherein there is at most a single dwell between said time resets wherein the first and second logical tones will be mapped to correspond to the same physical tone.

19. The method of claim 18, wherein the first logical tone index is any tone index from the set of logical tone indexes and wherein the second logical tone index is any tone index from the set of logical tone indexes.

20. The method of claim 12, wherein the periodicity of the hopping function is longer than the interval between resets of the linear time dependent parameter; and
   wherein for any two sectors corresponding to different cells, said different cells having different cell identifiers, said two sectors including a first sector and a second sector which each use the same set of logical tone indexes, in the first sector for a first logical tone index and in the second sector for a second logical tone index, during the interval between said occurrence of said resets, with respect to the first sector the first logical tone index will be mapped to a first corresponding physical tone on a dwell by dwell basis and with respect to the second sector the second logical tone will be mapped to a second corresponding physical tone on a dwell by dwell basis, and wherein there is at most at most two dwells between said time resets wherein the first and second logical tones will be mapped to correspond to the same physical tone.

21. The method of claim 20, wherein the first logical tone index is any tone index from the set of logical tone indexes and wherein the second logical tone index is any tone index from the set of logical tone indexes.

22. The method of claim 3, wherein said hopping function can be expressed in the form of the equation:

$$f_s^T(j, k) = s/((1/j) + T*k + k^2),$$

where the operations in the equation are in GF(z)
where:
j is the logical tone index,
T is the sector type identifier,
s is the cell identifier,
k is the linear time dependent parameter,
$k^2$ is the quadratic time dependent parameter,
$f_s^T$ is a hopping function used in a sector with sector type identifier T and cell identifier s,
$f_s^T(j, k)$ is the physical tone index corresponding to logical tone j used during dwell k in a sector with sector type identifier T and cell identifier s,
z is the number of logical indexed tones and the number of physical indexed tones, and
wherein j, s, k, $k^2$, $f_s^T(j,k)$, z are non-negative integers.

23. The method of claim 22, wherein z is 113, T is a value in the set of {0, 1, 2}, s is an integer value in a set of at least 5 different integers, k is an integer greater than or equal to 0 and less than or equal to 59.

24. The method of claim 22, wherein k=(L mod 4)*15+ floor function ((t−9)/7), where
L is a superslot index within a beaconslot and L is an integer in the range 0 to 7,
t is a symbol index of a superslot having an index range of 0 to 113 and is an integer in the range 9 to 113.

25. The method of claim 3, further comprising:
determining said cell identifier from downlink signals received from a base station.

26. The method of claim 25, wherein determining said cell identifier includes determining the cell identifier from a pattern of high power signals received from said base station.

27. The method of claim 26, wherein said high power signals are pilot signals, beacon signals or a combination of pilot and beacon signals.

28. The method of claim 3, further comprising:
determining said sector type identifier from downlink signals received from a base station.

29. The method of claim 28, wherein determining said sector identifier includes determining the type identifier from a pattern of high power signals received from said base station.

30. The method of claim 29, wherein said high power signals are pilot signals, beacon signals or a combination of pilot and beacon signals.

31. The method of claim 3, wherein said method is a implemented by a base station.

32. A wireless terminal for use in a frequency division multiplexed communications system including a multi-sector cell, the wireless terminal comprising:
a tone hopping module for determining a plurality of physical tone indexes, said physical indexes corresponding to physical tones to be used to transmit signals based on a tone hopping function which uses a cell identifier and a sector identifier to control the mapping of logical tones to physical tones as a function of time; and
a transmitter for transmitting signals on physical tones corresponding to the determined physical tone indexes.

33. The wireless terminal of claim 32, wherein said tones are orthogonal frequency division multiplexing (OFDM) tones.

34. The wireless terminal of claim 33, wherein said determining step is preformed once per dwell, each dwell including a fixed number of consecutive orthogonal frequency division multiplexing (OFDM) time periods.

35. The wireless terminal of claim 32, wherein said tone hopping module has a timing input for receiving a timing value used in generating a quadratic time dependent parameter used in determining the plurality of physical tone indexes as a function of time.

36. The wireless terminal of claim 35, wherein said tone hopping module further includes:
means for using a linear time dependent parameter, which is a function of said timing value, in addition to said quadratic time dependent parameter, when determining the plurality or physical tone indexes as a function of time.

37. The wireless terminal of claim 36, wherein tone hopping module includes a sector identifier and a cell identifier input and wherein said tone hopping module uses at least one of said cell and sector identifiers to scale at least one of the linear time dependent parameter and said quadratic time dependent parameter.

38. The wireless terminal of claim 37, wherein said cell and sector identifiers are used in combination to scale one of said linear time dependent parameter and said quadratic time dependent parameter; and
wherein a single one of said cell and sector identifiers are used to scale the one of said linear time dependent parameter and said quadratic time dependent parameter which is not scaled using said combination of cell and sector identifiers.

39. The wireless terminal of claim 38, wherein said cell and sector identifiers are integer values.

40. The wireless terminal of claim 39, wherein said cell identifier is a value from a set of predetermined cell identifier values.

41. The wireless terminal of claim 40, wherein said sector identifier is a value from a set of predetermined sector type identifier values.

42. The wireless terminal of claim 34, wherein said tone hopping function is a periodic function having a predetermined period which is independent of both the sector type identifier and cell identifier.

43. The wireless terminal of claim 42, further comprising:
means for modular computation operations.

44. The wireless terminal of claim 41, where the sector type identifier is different for adjacent sectors of a cell.

45. The wireless terminal of claim 44, wherein the cell identifier is different for adjacent cells.

46. The wireless terminal of claim 42, wherein the linear time dependent parameter is reset on a periodic basis.

47. The wireless terminal of claim 46, wherein the linear time dependent parameter has a different value for each dwell that occurs between a reset.

48. The wireless terminal of claim 46, wherein the periodicity of the hopping function is longer than the interval between resets of the linear time dependent parameter.

49. The wireless terminal of claim 47, wherein the periodicity of the hopping function is longer than the interval between resets of the linear time dependent parameter; and
wherein for any two sectors of the same cell having different sector types and the same cell identifier, said two sectors including a first sector and a second sector, which each use the same set of logical tone indexes, in the first sector for a first logical tone index and in the second sector for a second logical tone index, during the interval between said occurrence of said resets, with respect to the first sector the first logical tone index will be mapped to a first corresponding physical tone on a dwell by dwell basis and with respect to the second sector the second logical tone index will be mapped to a second corresponding physical tone on a dwell by dwell basis, and wherein there is at most a single dwell between said time resets wherein the first and second logical tones will be mapped to correspond to the same physical tone.

50. The wireless terminal of claim 47, wherein the periodicity of the hopping function is longer than the interval between resets of the linear time dependent parameter; and
wherein for any two sectors corresponding to different cells, said different cells having different cell identifiers, said two sectors including a first sector and a second sector which each use the same set of logical tone indexes, in the first sector for a first logical tone index and in the second sector for a second logical tone index, during the interval between said occurrence of said resets, with respect to the first sector the first logical tone index will be mapped to a first corresponding physical tone on a dwell by dwell basis and with respect to the second sector the second logical tone will be mapped to a second corresponding physical tone on a dwell by dwell basis, and wherein there is at most at most two dwells between said time resets wherein the first and second logical tones will be mapped to correspond to the same physical tone.

51. The wireless terminal of claim 34, wherein said hopping function can be expressed in the form of the equation $$f_s^T(j,k) = s/((1/j) + T*k + k^2),$$

where the operations in the equation are in GF(z)
where:
j is the logical tone index,
T is the sector type identifier,
s is the cell identifier,
k is the linear time dependent parameter,
$k^2$ is the quadratic time dependent parameter,
$f_s^T$ is a hopping function used in a sector with sector type identifier T and cell identifier s,
$f_s^T(j, k)$ is the physical tone index corresponding to logical tone j used during dwell k in a sector with sector type identifier T and cell identifier s,
z is the number of logical indexed tones and the number of physical indexed tones, and
wherein j, s, k, $k^2$, $f_s^T(j,k)$, z are non-negative integers.

52. The wireless terminal of claim 51, wherein z is 113, T is a value in the set of {0, 1, 2}, s is an integer value in a set of at least 5 different integers, k is an integer greater than or equal to 0 and less than or equal to 59.

53. The wireless terminal of claim 51, wherein k=(L mod 4)*15+floor function ((t−9)/7),
where:
L is a superslot index within a beaconslot and L is an integer in the range 0 to 7,
t is a symbol index of a superslot having an index range of 0 to 113 and t is an integer in the range 9 to 113.

54. The wireless terminal of claim 33, further comprising:
a receiver module for receiving downlink signals; and
a slope determination module for determining said cell identifier from downlink signals received from a base station.

55. The wireless terminal of claim 54, wherein said slope determination module includes information about signal patterns corresponding to different cell identifiers for use in determining the cell identifier from a pattern of high power signals received from said base station.

56. The wireless terminal of claim 55, wherein said high power signals from which a cell identifier is determined include pilot signals, beacon signals or a combination of pilot and beacon signals.

57. The wireless terminal claim 56, further comprising:
a sector type determination module for determining said sector type identifier from downlink signals received from the base station.

58. A method of implementing tone hopping in a frequency division multiplexed system, said system including at least one cell including multiple sectors, the method comprising the steps of:
determining a plurality of physical tone indexes, said physical indexes corresponding to physical tones to be used to transmit signals based on a tone hopping function which uses a cell identifier and a sector identifier to control the mapping of logical tones to physical tones as a function of time; and
receiving signals using said physical tones corresponding to the determined physical tone indexes.

59. The method of claim 58, wherein said tones are orthogonal frequency division multiplexing (OFDM) tones.

60. The method of claim 59, wherein said determining step is preformed once per dwell, each dwell including a fixed number of consecutive orthogonal frequency division multiplexing (OFDM) time periods.

61. The method of claim 58, wherein determining the plurality of physical tone indexes as a function of time includes using a quadratic time dependent parameter.

62. The method of claim 61, wherein determining the plurality of physical tone indexes as a function of time further includes using a linear time dependent parameter in addition to said quadratic time dependent parameter.

63. A base station for use in a frequency division multiplexed communications system including a multi-sector cell, the base station comprising:
a tone hopping module for determining a plurality of physical tone indexes, said physical indexes corresponding to physical tones to be used to transmit signals based on a tone hopping function which uses a cell identifier and a sector identifier to control the mapping of logical tones to physical tones as a function of time; and
a receiver for receiving signals on physical tones corresponding to the determined physical tone indexes.

64. The base station of claim 63, wherein said tones are orthogonal frequency division multiplexing (OFDM) tones.

65. The base station of claim 64, wherein said determining step is preformed once per dwell, each dwell including a fixed number of consecutive orthogonal frequency division multiplexing (OFDM) time periods.

66. The base station of claim 63, wherein said tone hopping module has a timing input for receiving a timing value used in generating a quadratic time dependent parameter used in determining the plurality of physical tone indexes as a function of time.

67. The base station of claim 66, wherein said tone hopping module further includes:
means for using a linear time dependent parameter, which is a function of said timing value, in addition to said quadratic time dependent parameter, when determining the plurality of physical tone indexes as a function of time.

68. A wireless terminal for use in a frequency division multiplexed communications system including a multi-sector cell, the wireless terminal comprising:
tone hopping means for determining a plurality of physical tone indexes, said physical indexes corresponding to physical tones to be used to transmit signals based on a tone hopping function which uses a cell identifier and a sector identifier to control the mapping of logical tones to physical tones as a function of time; and
transmitter means for transmitting signals on physical tones corresponding to the determined physical tone indexes.

69. The wireless terminal of claim 68,
wherein said hopping function can be expressed in the form of the equation:

$$f_s^T(j,k) = s/((1/j) + T*k + k^2),$$

where the operations in the equation are in GF(z)
where:
j is the logical tone index,
T is the sector type identifier,
s is the cell identifier,
k is the linear time dependent parameter,
$k_2$ is the quadratic time dependent parameter,
$f_s^T$ is a hopping function used in a sector with sector type identifier T and cell identifier s,
$f_s^T(j, k)$ is the physical tone index corresponding to logical tone j used during dwell k in a sector with sector type identifier T and cell identifier s,
z is the number of logical indexed tones and the number of physical indexed tones, and
wherein j, s, k, $k^2$, $f_s^T(j,k)$, z are non-negative integers.

70. The wireless terminal of claim 69, wherein said tones are orthogonal frequency division multiplexing (OFDM) tones.

71. A computer readable medium for use in a wireless terminal in a frequency division multiplexed communications system including a multi-sector cell, said computer readable medium comprising:
instructions for causing the wireless terminal to determine a plurality of physical tone indexes, said physical indexes corresponding to physical tones to be used to transmit signals based on a tone hopping function which uses a cell identifier and a sector identifier to control the mapping of logical tones to physical tones as a function of time; and
instructions for causing the wireless terminal to transmit signals on physical tones corresponding to the determined physical tone indexes.

72. A computer readable medium for use in a base station in a frequency division multiplexed communications system including a multi-sector cell, said computer readable medium comprising:
instructions for causing the base station to determine a plurality of physical tone indexes, said physical indexes corresponding to physical tones to be used to transmit signals based on a tone hopping function which uses a cell identifier and a sector identifier to control the mapping of logical tones to physical tones as a function of time; and
instructions for causing the base station to receive signals on physical tones corresponding to the determined physical tone indexes.

73. A base station for use in a frequency division multiplexed communications system including a multi-sector cell, the base station comprising:
tone hopping means for determining a plurality of physical tone indexes, said physical indexes corresponding to physical tones to be used to transmit signals based on a tone hopping function which uses a cell identifier and a sector identifier to control the mapping of logical tones to physical tones as a function of time; and
receiver means for receiving signals on physical tones corresponding to the determined physical tone indexes.

74. The base station of claim 73, wherein said hopping function can be expressed in the form of the equation:

$$f_s^T(j,k) = s/((1/j) + T*k + k^2),$$

where the operations in the equation are in GF(z)
where:
j is the logical tone index,
T is the sector type identifier,
s is the cell identifier,
k is the linear time dependent parameter,
$k^2$ is the quadratic time dependent parameter,
$f_s^T$ is a hopping function used in a sector with sector type identifier T and cell identifier s,
$f_s^T(j, k)$ is the physical tone index corresponding to logical tone j used during dwell k in a sector with sector type identifier T and cell identifier s,
z is the number of logical indexed tones and the number of physical indexed tones, and
wherein j, s, k, $k^2$, $f_s^T(j,k)$, z are non-negative integers.

75. The base station of claim 74, wherein said tones are orthogonal frequency division multiplexing (OFDM) tones.

76. A machine readable medium having machine executable instructions for causing a computer to:
determine a plurality of physical tone indexes, said physical indexes corresponding to physical tones to be used to transmit signals based on a tone hopping function which uses a cell identifier and a sector identifier to control the mapping of logical tones to physical tones as a function of time; and
transmit signals using said physical tones corresponding to the determined physical tone indexes.

77. A machine readable medium having machine executable instructions for causing a computer to:
determine a plurality of physical tone indexes, said physical indexes corresponding to physical tones to be used to transmit signals based on a tone hopping function which uses a cell identifier and a sector identifier to control the mapping of logical tones to physical tones as a function of time; and
receive signals using said physical tones corresponding to the determined physical tone indexes.

* * * * *

UNITED STATES PATENT AND TRADEMARK OFFICE
CERTIFICATE OF CORRECTION

PATENT NO. : 7,715,845 B2
APPLICATION NO. : 11/316353
DATED : May 11, 2010
INVENTOR(S) : Jin et al.

Page 1 of 1

It is certified that error appears in the above-identified patent and that said Letters Patent is hereby corrected as shown below:

Column 23, line 11, claim 20: "at most at most" to read as --at most--

Column 23, line 37, claim 22: "$f_s^T(j,k)$" to read as --$f_s^T(j, k)$--

Column 23, line 42, claim 24: "and is" to read as --and t is--

Column 24, line 01, claim 31: "method is a implemented" to read as --method is implemented--

Column 24, line 33, claim 37: "wherein tone hopping" to read as --wherein said tone hopping--

Column 24, line 66, claim 46: "said linear time dependent parameter" to read as --a linear time dependent parameter--

Column 25, line 40, claim 50: "at most at most" to read as --at most--

Column 25, line 62, claim 51: "$f_s^T(j,k)$" to read as --$f_s^T(j, k)$--

Signed and Sealed this
Twelfth Day of July, 2011

David J. Kappos
*Director of the United States Patent and Trademark Office*